(12) United States Patent
Goeury

(10) Patent No.: US 6,775,286 B1
(45) Date of Patent: Aug. 10, 2004

(54) DATA PACKET ROUTER

(75) Inventor: Alain Goeury, Cherisy (FR)

(73) Assignee: Bull S.A., Angers (FR)

(*) Notice: Subject to any disclaimer, the term of this patent is extended or adjusted under 35 U.S.C. 154(b) by 0 days.

(21) Appl. No.: 09/530,897

(22) PCT Filed: Sep. 6, 1999

(86) PCT No.: PCT/FR99/02117

§ 371 (c)(1),
(2), (4) Date: May 8, 2000

(87) PCT Pub. No.: WO00/14930

PCT Pub. Date: Mar. 16, 2000

(30) Foreign Application Priority Data

Sep. 8, 1998 (FR) .......................................... 98 11205

(51) Int. Cl.[7] .............................................. H04L 12/28
(52) U.S. Cl. ...................... 370/392; 370/401; 370/413
(58) Field of Search ................................ 370/389, 351, 370/392, 231, 401, 400, 413, 419; 710/1, 52, 310; 711/104, 154, 170

(56) References Cited

U.S. PATENT DOCUMENTS

| | | | |
|---|---|---|---|
| 4,403,321 A | | 9/1983 | Kruger |
| 5,151,996 A | * | 9/1992 | Hillis .......................... 395/800 |
| 6,381,247 B1 | * | 4/2002 | Munter et al. .............. 370/419 |

FOREIGN PATENT DOCUMENTS

| | | |
|---|---|---|
| EP | 0 492 026 A | 7/1992 |
| EP | 0 504 710 A | 9/1992 |

* cited by examiner

Primary Examiner—Duc Ho
(74) Attorney, Agent, or Firm—Edward J. Kondracki; Miles & Stockbridge P.C.

(57) ABSTRACT

A router comprising a number n of inputs (9, 19, 29, 39) and a number n of outputs (49, 59, 69, 79) is intended for routing data packets from the inputs (9, 19, S29, 39) to the outputs (49, 59, 69, 79). The router includes a reticular routing switch constituted by a number n of first incoming lines (5, 6, 7, 8), a number n of second incoming lines (1, 2, 3, 4), a number n of first outgoing lines (50, 60, 70, 80) and a number n of second outgoing lines (10, 20, 30, 40), each of the first incoming lines (5, 6, 7, 8) being respectively connected to an input (9, 19, 29, 39) and each of the first outgoing lines (50, 60, 70, 80) being respectively connected to an input (49, 59, 69, 79). The router further includes a memory (89) comprising a number n of write inputs (101, 102, 103, 104) each connected to one of the second outgoing lines (10, 20, 30, 40), a number n of read outputs (110, 120, 130, 140) each connected to one of the second incoming lines (1, 2, 3, 4), and a number n of groups of n cells (111, 112, 113, 114), (121, 122, 123, 124), (131, 132, 133, 134), 141, 142, 143, 144). Each read line (110) is configured to allow an extraction of a packet contained in a group of n cells (111 through 114); and each write line (101) is configured to allow an insertion of a packet into one of the cells (111, 121, 131, 141) of each group of n cells.

40 Claims, 11 Drawing Sheets

US 6,775,286 B1

DATA PACKET ROUTER

BACKGROUND OF THE INVENTION

1. Field of the Invention

The field of the invention is that of information technology, and more specifically, routers.

2. Description of Related Art

In a computer system, a network makes it possible to link together various data terminal equipment units for the purpose of exchanging information by means of data packets which they transmit.

A router is a device for switching data packets through the network in order to send them to the destination data terminal equipment. Each data packet generally includes in a header the means for recognizing a destination address, which allows the router to switch the packet to another router or directly to the destination data terminal equipment.

Certain routers are actual computers connected to the network. Such routers analyze the packet headers, possibly storing the packets before retransmitting all or some of them through the network, depending on network availability. Intermediate processing by these types of routers sometimes introduces less-than-desirable latencies into the transfer of packets through the network.

To reduce the latency of transfers in the network, some routers have been designed in the form of integrated circuits that constitute autoswitches with a minimum of intermediate storage.

When the data terminal equipment units are computers and peripherals, the transit times of the data packets between data terminal equipment units imposed by the physical links are relatively long compared to the processing capacities of the current machines. When the data terminal equipment units in a computer system are microprocessors, storage units and input-output units, overly long transit times of the data packets between data terminal equipment units will harm the performance of the system.

A router of the autoswitch type generally comprises a number n of inputs and a number n of outputs, for routing data packets from the inputs to the outputs. In order to constitute a network, inputs and outputs of the router are respectively connected to outputs and inputs of data terminal equipment or of other routers. Such a router comprises a minimum amount of memory in the form of buffers for temporarily accumulating data packets when the outputs cannot immediately absorb the load of the packets arriving through the inputs. This is the case, for example, when data packets arriving through several inputs are to be routed to the same output.

A buffer constituted by one or more cells, each cell specifically assigned to a respective input, constitutes an input queue. The drawback of an input queue is that when the output to which a data packet in question is to be routed is not available, the packet in question blocks the routing of subsequent packets that arrive through the same input. Even if there is an output available for a subsequent packet, this subsequent packet will remain unduly blocked by the packet in question until it is routed to an available output. This phenomenon harms the performance of the router.

A buffer constituted by one or more cells, specifically assigned to each output, constitutes an output queue. When an output to which a data packet in question is to be routed is not available, the data packet in question is accumulated in the output buffer, and waits for release. Thus, the packet in question does not block subsequent packets that arrive through the same input but are intended for another output. There is still a problem when several of the packets in question arrive through several inputs in order to be simultaneously routed to the same output. According to the prior art, the output queue then creates a bottleneck in the routing of the packets in question.

One solution, which consists of also installing an input buffer in order to make each packet in question wait while the other packets in question are routed to the output buffer, still has the drawback of the input queue phenomenon.

A solution that consists of multiplying, by the number n of inputs, the processing frequency of the router relative to the arrival frequency of the data through the inputs, runs the risk of being limited by the physical structure of the router. For example, it is difficult to obtain cycle times of less than one nanosecond in 0.5-micron CMOS technology for complex logical circuits. This limits the arrival frequency of data through the inputs to an order of magnitude of one GHz.

A solution that consists of equipping the router with a bus with a data path width equal to n times the data path width in one input requires complex control of this bus.

SUMMARY OF THE INVENTION

The subject of the invention is a router comprising a number n of inputs and a number n of outputs, for routing data packets from the inputs to the outputs. To eliminate the drawbacks mentioned above, the router according to the invention comprises:

- a reticular routing switch constituted by a number n of first incoming lines, by a number n of second incoming lines, by a number n of first outgoing lines, and by a number n of second outgoing lines, each of the first incoming lines being respectively connected to an input and each of the first outgoing lines being respectively connected to an output;
- an accumulator memory comprising a number n of write inputs, each connected to one of the second outgoing lines, a number n of read outputs, each connected to one of the second incoming lines, and a number n of groups of n cells;
- each read line configured to allow an extraction of a packet contained in a group of n cells; and
- each write line configured to allow an insertion of a packet into one of the cells of each group of n cells.

The n second outgoing lines of the reticular switch make it possible to route a data packet in question through one of these n second outgoing lines if the one of the n first outgoing lines connected to the output to which the data packet is to be routed is not available. There is always at least one outgoing line available for each input because there are as many second outgoing lines as first incoming lines. The accumulator memory makes it possible to save the data packet until the outgoing line again becomes available, to the extent that its capacity allows. The n second incoming lines of the reticular switch make it possible to route the packet in question to the output as soon as the outgoing line again becomes available. There is always at least one incoming line available for each output because there are as many second incoming lines as first outgoing lines. The capability to extract the packets from a group of cells through a read line connected to one of the second incoming lines gives the group of cells the advantages of an output queue. The possibility of inserting a packet into the group of cells through each write line connected to a second outgoing line considerably reduces the bottleneck that exists for the prior known output queues.

BRIEF DESCRIPTION OF THE DRAWINGS

Other advantageous characteristics are taught through a preferred embodiment of the invention, described below in reference to the figures, in which.

DESCRIPTION OF THE PREFERRED EMBODIMENTS

Figure 1:
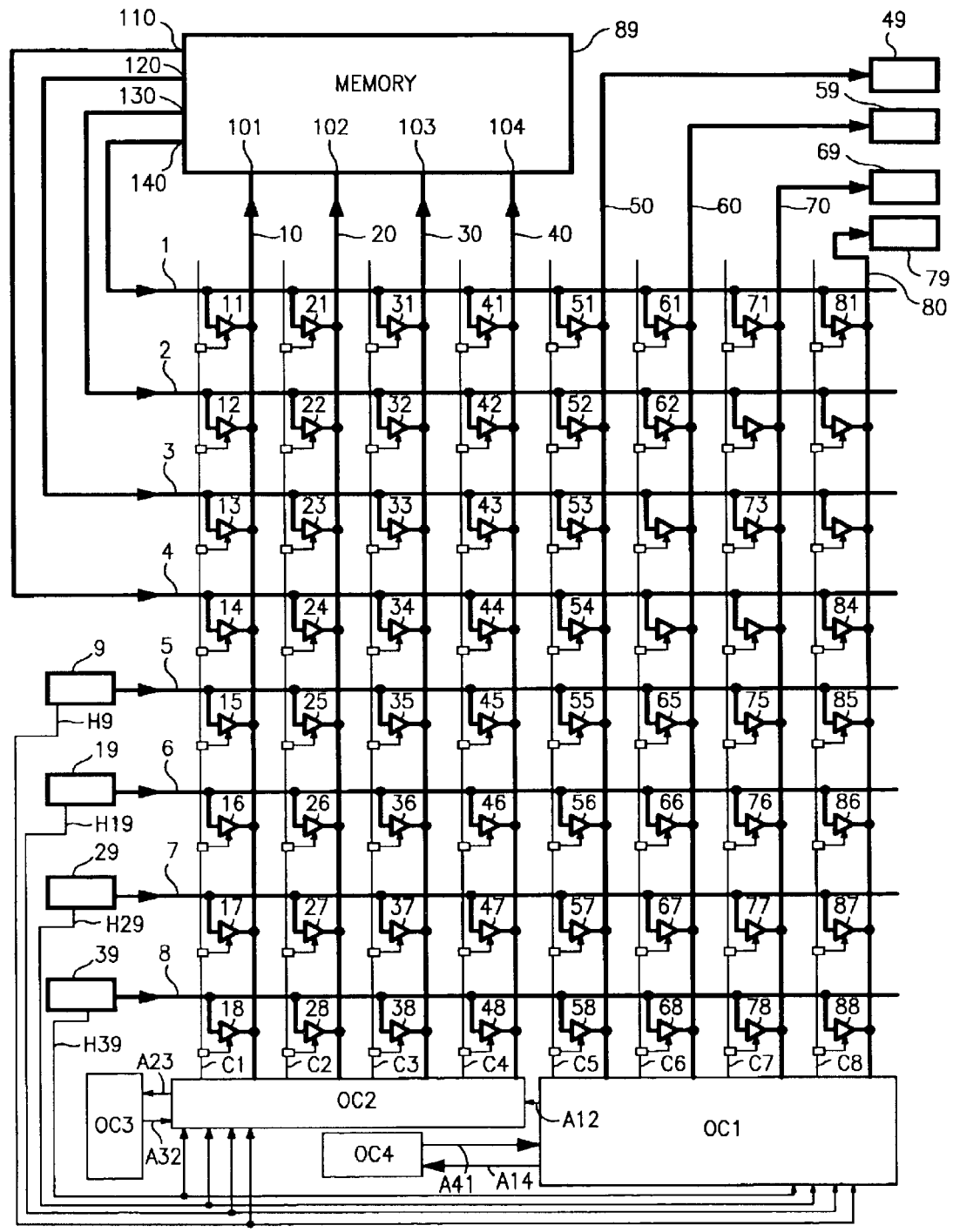
FIG. 1 represents a reticular router network according to the invention.

Referring to FIG. 1, a router comprising a number n of inputs 9, 19, 29, 39 and a number n of outputs 49, 59, 69, 79, is intended for routing data packets from the inputs 9, 19, 29, 39 to the outputs 49, 59, 69, 79. The router comprises:

a reticular routing switch constituted by a number n of first incoming lines 5, 6, 7, 8, a number n of second incoming lines 1, 2, 3, 4, a number n of first outgoing lines 50, 60, 70, 80 and a number n of second outgoing lines 10, 20, 30, 40;

a memory 89 comprising a number n of write inputs 101, 102, 103, 104, each connected to one of the second outgoing lines 10, 20, 30, 40, and a number n of read outputs 110, 120, 130, 140, each connected to one of the second incoming lines 1, 2, 3, 4.

Each of the first incoming lines 5, 6, 7, 8 is respectively connected to an input 9, 19, 29, 39 and each of the first outgoing lines 50, 60, 70, 80 is respectively connected to an output 49, 59, 69, 79. Each line marked i, i varying from 1 to 2n, is switchable to a line marked j0, j varying from 1 to 2n, by means of a controlled switch marked ji. For example, the switch 51 makes it possible to switch the incoming line 1 to the outgoing line 50, the switch 15 makes it possible to switch the incoming line 5 to the outgoing line 10. The reticular switch thus comprises 2n times 2n switches ij. In the figures represented here, the value of n is four, but the explanations remain valid for any value of n.

A first control device OC1 makes it possible to control the switches 51 through 58 by means of a signal C5, the switches 61 through 68 by means of a signal C6, the switches 71 through 78 by means of a signal C7, and the switches 81 through 88 by means of a signal C8.

A second control device OC2 makes it possible to control the switches 11 through 18 by means of a signal C1, the switches 21 through 28 by means of a signal C2, the switches 31 through 38 by means of a signal C3 and the switches 41 through 48 by means of a signal C4.

Each of the n signals C1 through C4 and the n signals C5 through C8 is coded through as many conductor strands as necessary so that more than one switch is closed on the same outgoing line, in order to prevent any short circuit between incoming lines.

Each data packet arriving through the inputs 9, 19, 29, 39 of the router comprises a header that indicates the output or outputs 49, 59, 69, 79 to which the data packet is to be routed. Each time a data packet arrives through the input 9, 19, 29, 39, its respective header H9, H19, H29, H39 is read by the devices OC1 and OC2. Each data packet also comprises an end-of-packet indication, which allows the resetting to zero of the signal C5, C6, C7, C8 by the device OC1 when the device OC1 detects an end-of-packet on the respective line 50, 60, 70, 80, and of the signal C1, C2, C3, C4 by the device OC2 when the device OC2 detects an end-of-packet on the respective line 10, 20, 30, 40.

The control device OC1 receives a signal A41 issued by a fourth control device OC4 whose functionalities will be described in reference to FIG. 2. The signal A41 codes requests for switching the line 1 to the line 50, the line 2 to the line 60, the line 3 to the line 70, the line 4 to the line 80. The signal A41 is for example a word of n bits wherein the position of each of the n bits corresponds to an index of an incoming line, and wherein the setting of a bit to one indicates a switching request. The device OC1 sends a signal A14 to the device OC4 to acknowledge the signal A41. The control device OC1 sends a signal A12 to the device OC2 to indicate to it which inputs 9, 19, 29, 39 are under the control of the device OC1. The signal A12 is, for example, a word of n bits, each corresponding to an input, and wherein the high state of a bit indicates that the corresponding input is under the control of the device OC1.

Figure 2:
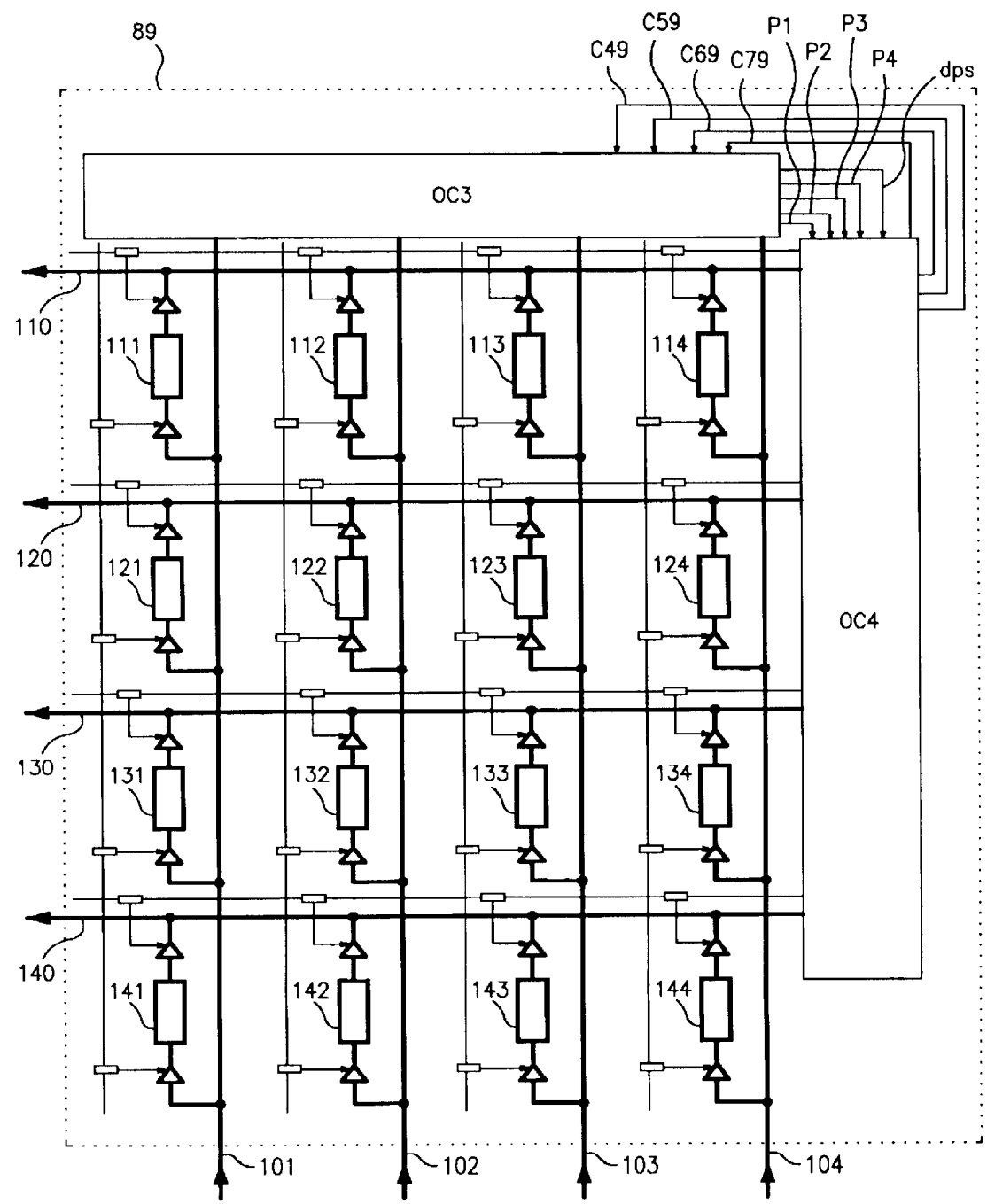
FIG. 2 represents an accumulator memory according to the invention.

The device OC2 sends a signal A23 to a third control device OC3 whose functionalities are described in reference to FIG. 2. The signal A23 codes the addresses of cells of the accumulator memory 89 to be filled. The signal A23 is, for example, a word with n fields, each field corresponding to an outgoing line 10, 20, 30, 40. The device OC2 receives a signal A32 issued by the device OC3 for coding the addresses of the available cells of the accumulator memory 39.

Referring to FIG. 2, the memory 89 comprises n cells 111 through 114 read-accessible through the first read output 110, n cells 121 through 124 read-accessible through the next read output 120, n cells 131 through 134 read-accessible through the (n−1)th read output 130, and n cells 141 through 144 read-accessible through the nth read output 140. For each group of cells read-accessible through an output 110, 120, 130, 140, there is one cell 111, 121, 131, 141 write-accessible through the write input 101, one cell 112, 122, 132, 142 write-accessible through the write input 102, one cell 113, 123, 133, 143 write-accessible through the write input 103, one cell 114, 124, 134, 144 write-accessible through the write input 104.

The control device OC3 activates the write into one of the cells 111, 121, 131, 141 by means of a signal A231, into one of the cells 112, 122, 132, 142 by means of a signal A232, into one of the cells 113, 123, 133, 143 by means of a signal A233, into one of the cells 114, 124, 134, 144 by means of a signal A234, as soon as it detects a packet header in the respective write input 101, 102, 103, 104.

The control device C4 activates a sequential reading of the non-empty cells in the group of n cells 111 through 114 as soon as the signal 141 indicates that the output 49 is available, a sequential reading of the non-empty cells in the group of n cells 121 through 124 as soon as the signal A41 indicates that the output 59 is available, a sequential reading of the non-empty cells in the group of n cells 131 through 134 as soon as the signal A41 indicates that the output 69 is available, and a sequential reading of the non-empty cells in the group of n cells 141 through 144 as soon as the signal A41 indicates that the output 79 is available.

The operation of the devices OC1, OC2, OC3, OC4 is timed by a common clock, each cycle of which comprises a high state followed by a low state. As soon as the devices OC1 and OC2 detect a header H9 of a new data packet arriving through the input 9, the devices OC1 and OC2 decode the header H9 during the high state of a first clock cycle CK1, so as to each independently determine a destination output of the packet from among the available outputs 49, 59, 69, 79.

In the case of packet traffic of the wormhole type, i.e., a transmission of packets one after another, the respective output 49, 59, 69, 79 is considered to be available when there is no packet traffic on the respective corresponding line 50, 60, 70, 80 and when this line is not reserved.

If the device OC1 determines an output from among the available outputs, the device OC1 takes control of the input 9 during the low state of the first clock cycle CK1 in order to initiate the transfer of the packet from the input 9 to the output determined. For example, if the output determined by the device OC1 is the output 59, the device OC1 reserves the outgoing line 60, switches the incoming line 5 to the outgoing line 60 by means of the signal C6 and activates the reading of the input 9 until the detection of the end-of-packet, which terminates the flow of the packet through the outgoing line 60, and reinitializes the corresponding line reservation through the input 9. In taking control of the input 9, the device OC1 sets the bit of the word A12 corresponding to the input 9 to the high state. This bit of the word A12 is reset to the low state by the device OC1 no later than when the header leaves the input 9 in order to be routed through the reticular network.

If the device OC1 cannot determine an output among the available outputs, the device OC1 does not take control of the input 9 and resets the corresponding bit of the word A12 to the low state.

Each output 49, 59, 69, 79 determined by the device OC2 respectively corresponds to a read line 110, 120, 130, 140 of the memory 89. Upon determining an output from the header H9, the device OC2 actually selects, independently from the device OC1, a cell of the memory 89 read-accessible through the read line 110, 120, 130, 140 corresponding to said output. The selection made from the group of cells read-accessible through the read line corresponding to the output determined, in accordance with an order of priority that is fixed a priori, is the first available cell write-accessible through a write line 101, 102, 103, 104. A cell of the memory 89 is considered available if it has enough space to accumulate a packet of maximum size. Advantageously in the case of wormhole type transfers, a cell can also be considered available if it is in the process of being read, i.e., emptied. A cell of the memory 89 is considered write-accessible if the outgoing line 10, 20, 30, 40 of the reticular switch, physically extended by the respective write line 101, 102, 103, 104 to which said cell is connected by means of its input switch, has not been already reserved by the device OC2. For example, if the device OC2 determines the output 59 for which the cells 122, 123, and 124 are available and only the cells 123 and 124 are write-accessible, the device OC2 reserves the line 30. Moreover, if during the high state of a second clock cycle CK2 the bit of the word A12 that corresponds to the input 9 is not in the high state, the device OC2 switches the incoming line 5 to the outgoing line 30 by means of the signal C3, tells the device OC3 to perform a write operation in the cell 123 by means of the signal A23, and activates a reading of the input 9 until an end-of-packet is detected, which clears the reservation of the outgoing line 30.

The preceding explanations in reference to the input 9 are valid for each of the inputs 19, 29, 39.

A condition can occur in which the devices OC1 and OC2 detect, in the same first clock cycle CK1, several headers H9, H19, H29, H39 of new data packets arriving simultaneously through the inputs 9, 19, 29, 39.

If on decoding the headers H9, H19, H29, H39, the device OC1 determines the same output, for example 69, to which the packets arriving in the inputs 9, 19, 29 are to be transferred, the device OC1 retains no more than one input, for example the input 19, in accordance with a rotating order of priority so as not to favor one input over the others on average. The device OC1 takes control of the input 19 as explained above, and sets to the high state the bit of the word A12 corresponding to the input 19 and leaves the other bits of the word A12 in the low state.

If on decoding the headers H9, H19, H29, H39, the device OC2 determines the same output, for example 69, to which the packets arriving in the inputs 9, 19, 29 are to be transferred, the device OC2 selects a cell of the memory 89 that is read-accessible as explained above. Of the inputs 9, 29 wherein the corresponding bit of the word A12 is in the low state, the device OC2 retains no more than one input, for example the input 29, in accordance with a rotating order of priority so as not to favor any input over the others on average. The device OC2 then takes control of the input 29 as explained above, and sets the corresponding bit of the word A12 to the high state. The device OC2 repeats the preceding operations in two clock cycles as long as the bits of the word A12 are in the low state. This way, the data packet arriving in the input 9 is written into a cell of the memory 89 two clock cycles after the data packet arriving in the input 29. The device OC2 establishes an order for writing into the memory 89, even for packets arriving in inputs simultaneously. The delay of two clock cycles thus artificially created in the transfer of the packet, is negligible compared to the number of clock cycles required for the flow of a packet to one output. This delay of two or at most (n−1) times two clock cycles does not result in any additional delay in the transfer of a packet to an output, beyond the packet's required wait for the end of the transfer of a preceding packet to the same output. This mechanism makes it possible to establish an order for the processing of packets arriving simultaneously, which maintains the order of arrival of packets arriving successively.

Figure 3:
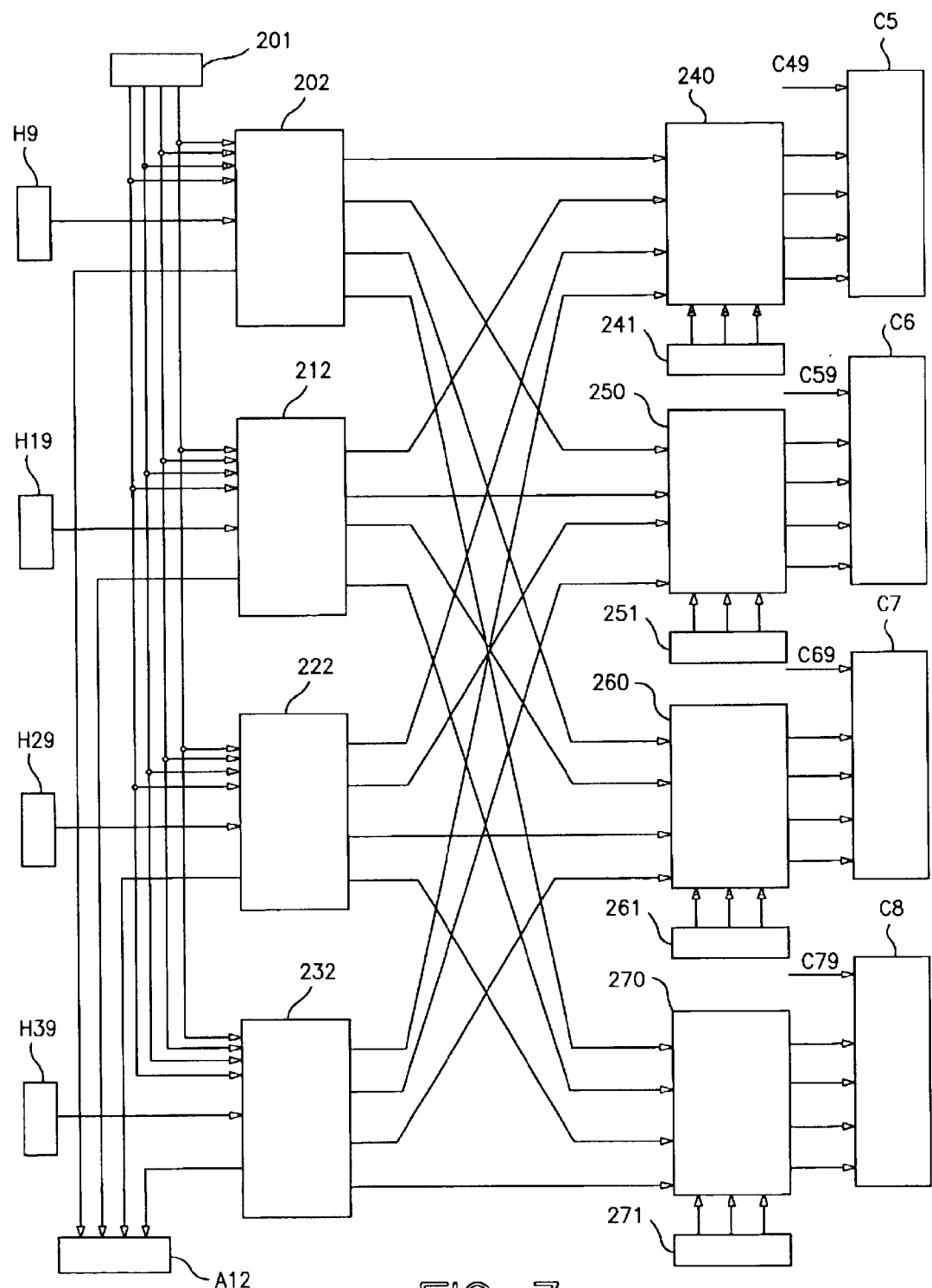
FIG. 3 represents a first device for switching the reticular network to the outputs of the router.

FIG. 3 presents a diagram of the generation of the signals C5 through C8 in the device OC1. The device OC1 has a status word 201 for the outputs. The status word 201 is a word of n bits, each assigned to an output, wherein the high state indicates that the corresponding output 49, 59, 69, 79 is available. Each input 9, 19, 29, 39 is respectively associated with a combinational block 202, 212, 222, 232. Each output 49, 59, 69, 79 is respectively associated with a combinational block 240, 250, 260, 270.

When the combinational block 202 receives a data packet header H9 during the high state of a first clock cycle CK1, it analyzes the header H9 by combining its data with the status of the word 201, in order to determine an output to which to route the data packet. If the block 202 determines the output 49, it sets to the high state a signal whose destination is the block 240, automatically maintained during the low state of the first clock cycle CK1. If the block 202 determines the output 59, it sets to the high state a signal whose destination is the block 250, automatically maintained during the low state of the first clock cycle CK1. If the block 202 determines the output 69, it sets to the high state a signal whose destination is the block 260, automatically maintained during the low state of the first clock cycle CK1. If the block 202 determines the output 79, it sets to the high state a signal whose destination is the block 270, automatically maintained during the low state of the first clock cycle CK1. Simultaneously, the block 202 sets to the high state the bit of the signal A12 corresponding to the input 9 in order to indicate that it is under the control of the device OC1. If the block 202 does not determine any output, it sets to the low state the bit of the signal A12 corresponding to the input 9, in order to indicate that it is not under the control of the device OC1.

The preceding explanations for the block 202 are also valid for each of the blocks 212, 222, 232, replacing the header H9 with the respective header H19, H29, H39, and the input 9 with the respective input 19, 29, 39.

During the low state of the first clock cycle CK1, the block 240 retains no more than one high state among the signals issuing from the blocks 202, 212, 222, 232, which it retranscribes into the signal C5. Simultaneously, the block 240 updates the status word 201 by setting to the low state the bit corresponding to the output 49, which is then unavailable for subsequent requests until an end-of-packet is detected. If the high state of the signal retained is the one issuing from the block 202, the signal C5 closes the switch 55. If the high state of the signal retained is the one issuing from the block 212, the signal C5 closes the switch 56. If the high state of the signal retained is the one issuing from the block 222, the signal C5 closes the switch 57. If the high state of the signal retained is the one issuing from the block 232, the signal C5 closes the switch 58. If a signal C49 issuing from the device OC4 is in the high state, the signal C49 has priority over the outputs from the block 240 and the signal C5 closes the switch 51.

In order to retain no more than one high state among the signals issuing from the blocks 202, 212, 222, 232, the block 240 is constituted by an arbitration circuit, explained in greater detail below in reference to FIG. 9. For this reason, the block 240 has a counter 241 whose content is an order of arbitration priority. The counter 241 is incremented by each new high state retained in order to establish a rotating order of arbitration priority, thus not favoring any input over the others.

The preceding explanations for the block 240 are also valid for each of the blocks 250, 260, 270, replacing the output 49 with the respective output 59, 69, 79, the signal C49 with a respective signal C59, C69, C79, the switches 55 through 58 with the respective switches 65 through 68, 75 through 78, 85 through 88, the switch 51 with the respective switch 62, 73, 84, the counter 241 with the respective counter 251, 261, 271, and the signal C5 with the respective signal C6, C7, C8.

Figure 4:
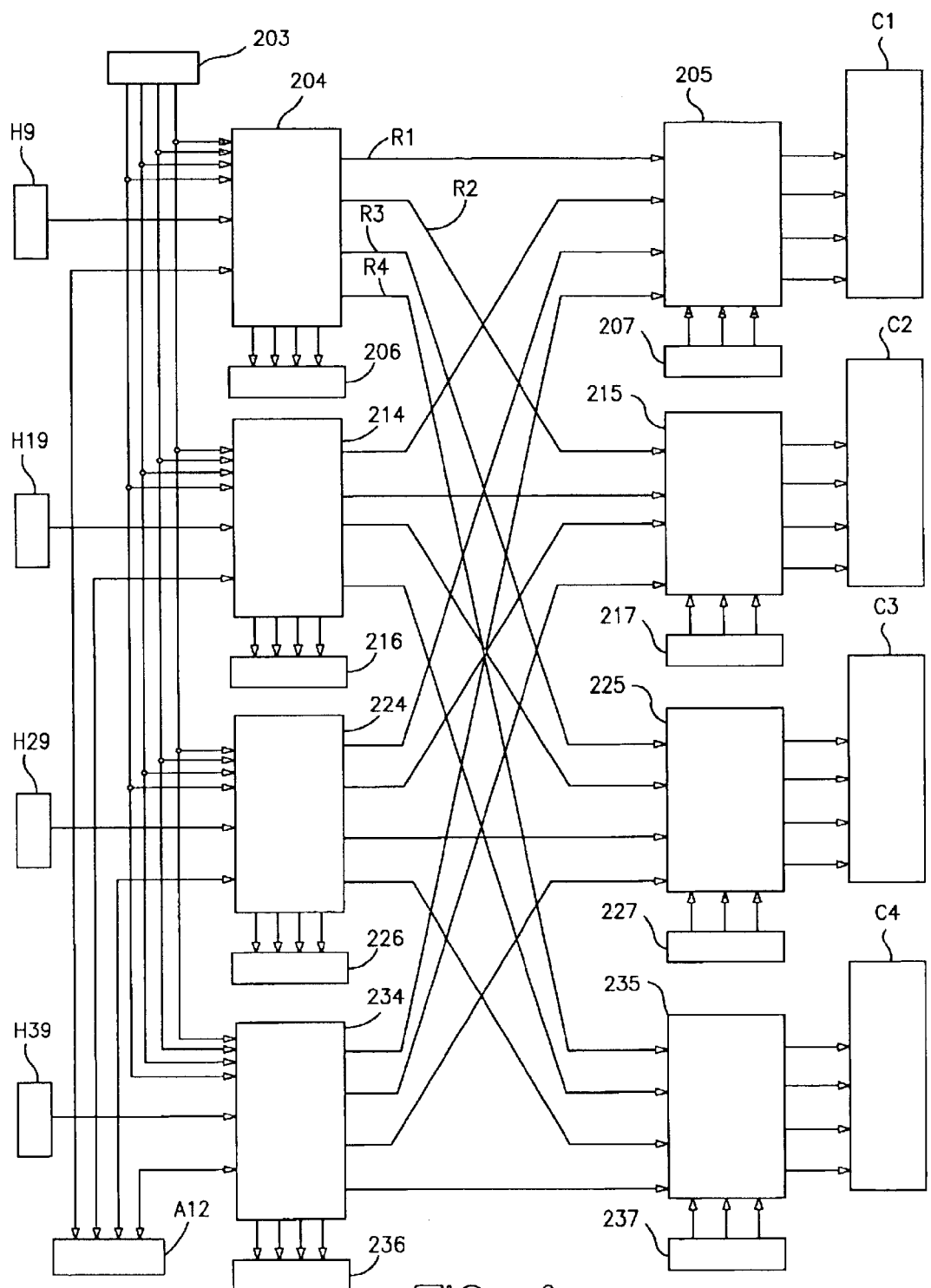
FIG. 4 represents a second device for switching the reticular network to the accumulator memory.

FIG. 4 represents a diagram of the generation of the signals C1 through C4 in the device OC2. The device OC2 has a status word 203 for the accumulator memory 89. The word 203 is a word of (n+1) times n bits. In FIG. 4, only n conductors issuing from the word 203 are represented in order not to unnecessarily over complicate the figure; each conductor represented should be considered to be constituted by (n+1) strands, each for carrying one bit of the word 203. For each write line 101, 102, 103, 104, one bit indicates the accessibility of the memory 89 through the corresponding line, and n bits indicate the available cells of the memory 89 that are switchable to the corresponding line, i.e., the state of the cells 111, 121, 131, 141 for the line 101, the state of the cells 112, 122, 132, 142 for the line 102, the state of the cells 113, 123, 133, 143 for the line 103, the state of the cells 114, 124, 134, 144 for the line 104. Each line 101, 102, 103, 104 being on the respective extension of an outgoing line 10, 20, 30, 40, accessibility through a write line 101, 102, 103, 104 is indicated by the fact that the corresponding outgoing line 10, 20, 30, 40 has not been reserved for carrying a data packet. The availability of the cells is indicated by the signal A32.

Each input 9, 19, 29, 39 is respectively associated with a combinational block 204, 214, 224, 234. Each outgoing line 10, 20, 30, 40 is respectively associated with a combinational block 205, 215, 225, 235.

When the combinational block 204 receives a data packet header H9 during the high state of a first clock cycle CK1, it analyzes the header H9 by combining its data with the status of the word 203, in order to determine an output queue to which, and an outgoing line through which to route the data packet. The output queue determined is coded into a word 206 of n bits, each bit corresponding to a read line 110, 120, 130, 140 of the memory 89. During the low state of the first clock cycle CK1, the outgoing line determined is enabled if and only if the bit of the word A12 corresponding to the input 9 is in the low state. If the block 204 determines the outgoing line 10, it sets to the high state a signal R1 whose destination is the block 205, automatically maintained during the high state of a second clock cycle CK2. If the block 204 determines the outgoing line 20, it sets to the high state a signal R2 whose destination is the block 215, automatically maintained during the high state of a second clock cycle CK2. If the block 204 determines the outgoing line 30, it sets to the high state a signal R3 whose destination is the block 225, automatically maintained during the high state of a second clock cycle CK2. If the block 204 determines the outgoing line 40, it sets to the high state a signal R4 whose destination is the block 235, automatically maintained during the high state of a second clock cycle CK2.

The preceding explanations for the block 204 are also valid for each of the blocks 214, 224, 234, replacing the header H9 with the respective header H19, H29, H39, the input 9 with the respective input 19, 29, 39, and the word 206 with the respective word 216, 226, 236.

During the high state of a second clock cycle CK2, the block 205 retains no more than one high state among the signals issuing from the blocks 204, 214, 224, 234, which it retranscribes into the signal C1. During the low state of the second clock cycle CK2, the block 205 sets to the high state the bit of the word A12 corresponding to the input retained. Simultaneously, the block 205 updates the status word 203 by setting to the low state the bit corresponding to the outgoing line 10, which is then unavailable for subsequent requests until an end-of-packet is detected. If the high state of the signal retained is the one issuing from the block 204, the signal C1 closes the switch 15. If the high state of the signal retained is that issuing from the block 214, the signal C1 closes the switch 16. If the high state of the signal retained is the one issuing from the block 224, the signal C1 closes the switch 17. If the high state of the signal retained is the one issuing from the block 234, the signal C1 closes the switch 18.

In order to retain no more than one high state among the signals issuing from the blocks 204, 214, 224, 234, the block 205 is constituted by an arbitration circuit, explained in greater detail below in reference to FIG. 9. For this reason, the block 205 has a counter 207 whose content is an order of arbitration priority. The counter 207 is incremented by each new high state retained in order to establish a rotating order of arbitration priority, thus not favoring any input over the others.

The preceding explanations for the block 205 are also valid for each of the blocks 215, 225, 235, replacing the outgoing line 10 with the respective outgoing line 20, 30, 40, the switches 15 through 18 with the respective switches 25 through 28, 35 through 38, 45 through 48, the counter 207 with the respective counter 217, 227, 237, the signal C1 with the respective signal C2, C3, C4.

In each clock cycle CK1 that follows a clock cycle CK2, the operations explained above are repeated for each input wherein the corresponding bit of the word A12 has not been set to the high state after the detection of a header, which systematically sets it to zero as long as the header is present in the corresponding input.

Figure 5:
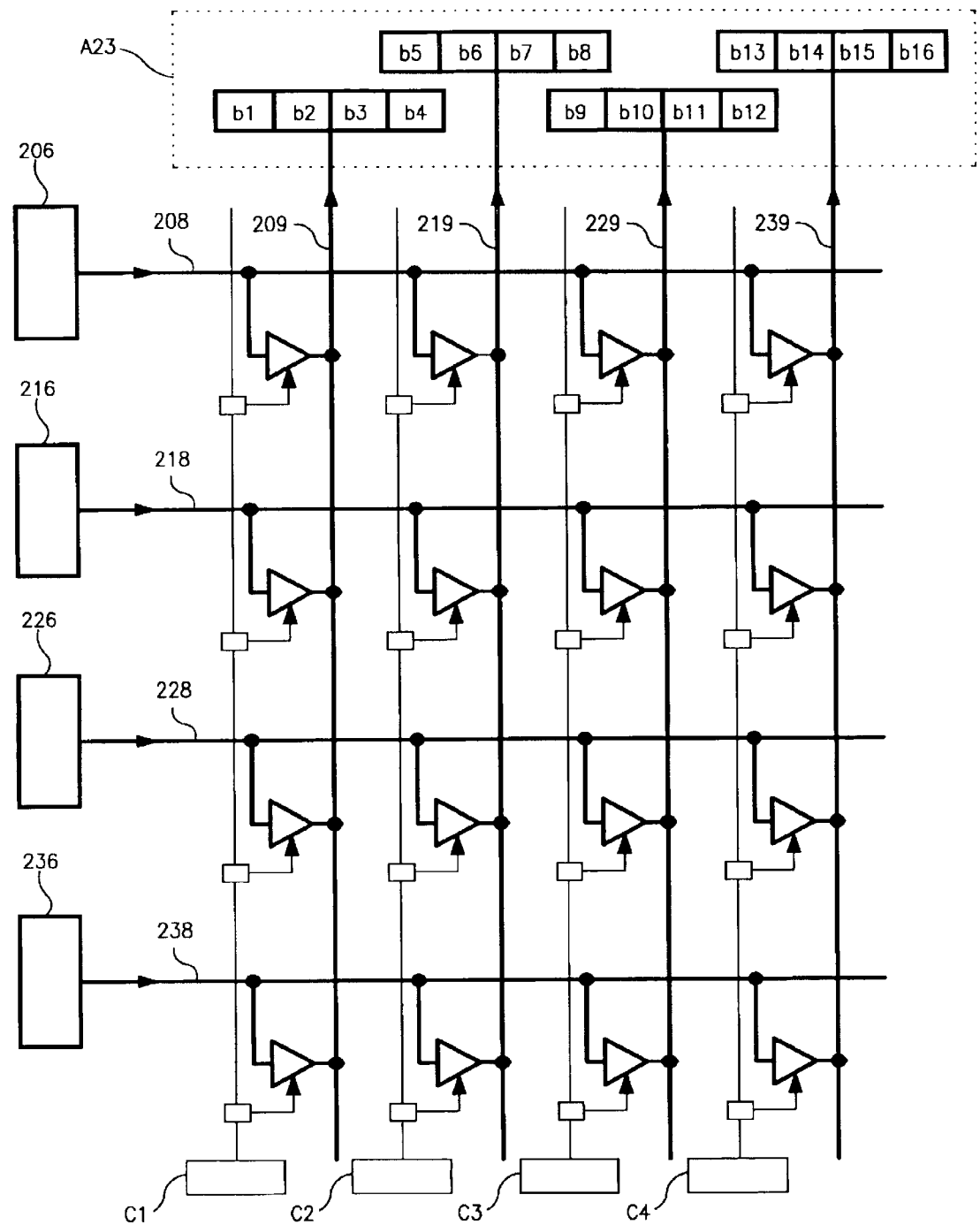
FIG. 5 represents a reticular control network.

In addition, the control device OC2 comprises a reticular control network represented in reference to FIG. 5. The reticular control network is an image of the part of the reticular routing network constituted by the n incoming lines 5 through 8 and the n outgoing lines 10, 20, 30, 40 in reference to FIG. 1. Just like that part of the reticular routing network, the reticular control network is controlled by the signals C1 through C4.

The reticular control network is constituted by n incoming lines 208, 218, 228, 238 and n outgoing lines 209, 219, 229, 239. The reticular control network receives through the incoming line 208 the value of the word 206, through the incoming line 218 the value of the word 216, through the incoming line 228 the value of the word 226, through the incoming line 238 the value of the word 236, as generated by the device OC2 in reference to FIG. 4. Each of the lines 208, 218, 228, 238, 209, 219, 229, 239 is constituted by as many strands as necessary for coding whichever bits of the words 206, 216, 226, 236 are in the high state. The outgoing line 209 is switchable to any of the lines 208, 218, 228, 238 by the signal C1 by means of switches similar to the switches 15 through 18 of the reticular routing network. The outgoing line 219 is switchable to any of the lines 208, 218, 228, 238 by the signal C2 by means of switches similar to the switches 25 through 28 of the reticular routing network. The outgoing line 229 is switchable to any of the lines 208, 218, 228, 238 by the signal C3 by means of switches similar to the switches 35 through 38 of the reticular routing network. The outgoing line 239 is switchable to any of the lines 208, 218, 228, 238 by the signal C4 by means of switches similar to the switches 45 through 48 of the reticular routing network.

The output of the reticular control switch generates the signal A23 wherein each of the n times n bits b1 through b16 is intended to activate a write operation in a cell of the accumulator memory 89.

The value of the word 206 codes an output queue selected by the block 204, i.e., the group of cells 111 through 114, 121 through 124, 131 through 134, 141 through 144 corresponding to this output queue.

When the signal C1 switches the incoming line 5 to the outgoing line 10 of the reticular routing network, the signal C1 switches the incoming line 208 to the outgoing line 209 of the reticular control network. The value of the word 206 is transferred into the group of bits b1 through b4 wherein the bit in the high state activates a write operation into one of the cells 111, 121, 131, 141 corresponding to the output queue selected for the input 9.

When the signal C2 switches the incoming line 5 to the outgoing line 20 of the reticular routing network, the signal C2 switches the incoming line 208 to the outgoing line 219 of the reticular control network. The value of the word 206 is transferred into the group of bits b5 through b8 wherein the bit in the high state activates a write operation into one of the cells 112, 122, 132, 142 corresponding to the output queue selected for the input 9.

When the signal C3 switches the incoming line 5 to the outgoing line 30 of the reticular routing network, the signal C3 switches the incoming line 208 to the outgoing line 229 of the reticular control network. The value of the word 206 is transferred into the group of bits b9 through b12, wherein the bit in the high state activates a write operation into one of the cells 113, 123, 133, 143 corresponding to the output queue selected for the input 9.

When the signal C4 switches the incoming line 5 to the outgoing line 40 of the reticular routing network, the signal C4 switches the incoming line 208 to the outgoing line 239 of the reticular control network. The value of the word 206 is transferred into the group of bits b13 through b16 wherein the bit in the high state activates a write operation into one of the cells 114, 124, 134, 144 corresponding to the output queue selected for the input 9.

The preceding explanations for the input 9 and the incoming line 5 are also valid for the input 19 and the incoming line 6, for the input 29 and the incoming line 7, for the input 39 and the incoming line 8, replacing the word 206 with the respective word 216, 226, 236, and replacing the incoming line 208 with the respective incoming line 218, 228, 238.

Thus, for example, if the output queue corresponding to the read line 130 of the memory 89 is selected by the word 216 for the input 19 and if the outgoing line 40 is switched to the incoming line 6 of the reticular routing switch, the bit b15 of the signal A23 is set to the high state. The data packet presented to the input 19 of the router is written into the cell 134 of the memory 89.

Figure 6:
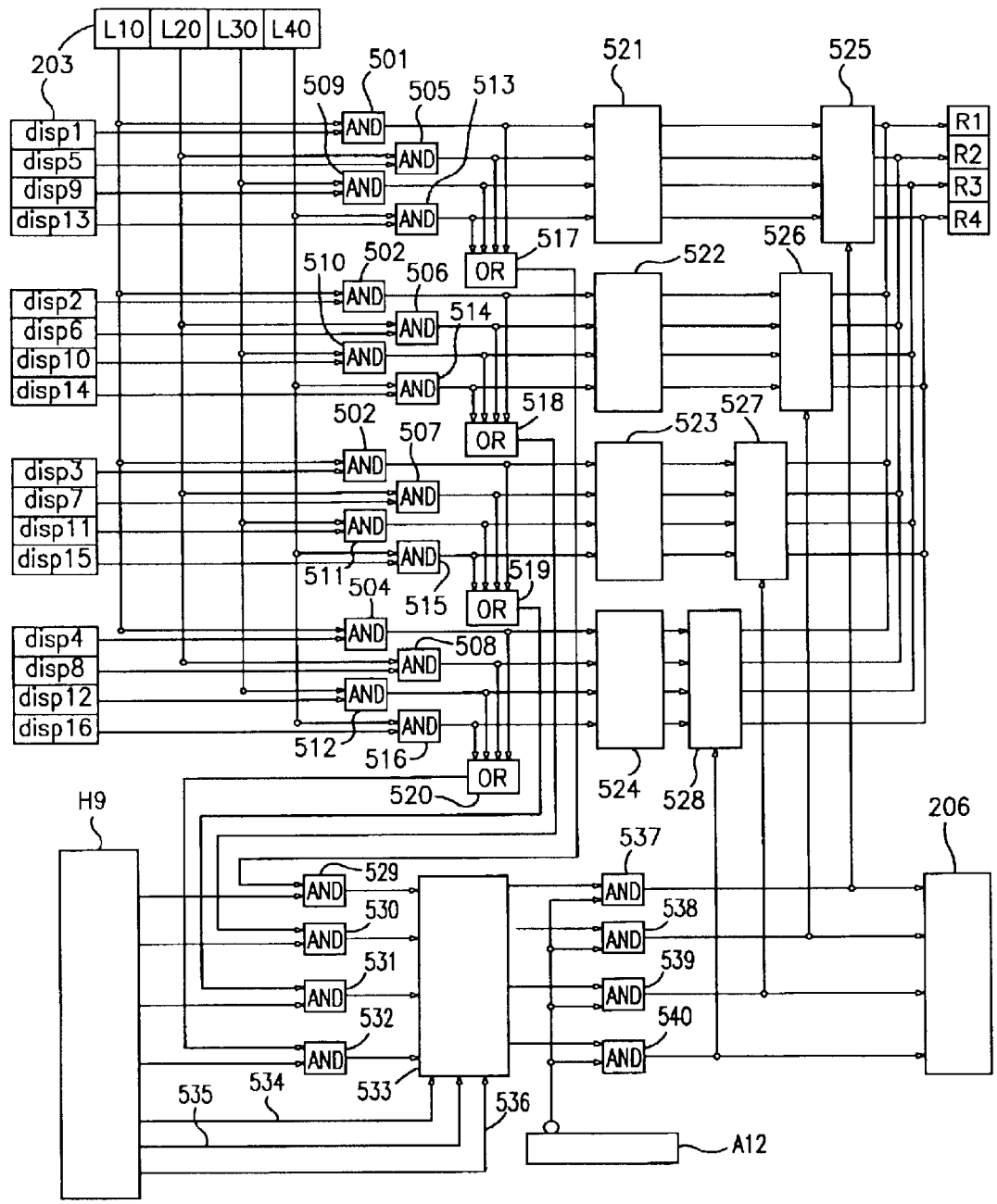
FIG. 6 represents additional details of the second device.

Each combinational block 204, 214, 224, 234 comprises the elements described below in reference to FIG. 6. For example the combinational block 204 receives as input the content of the word 203 indicating the accessibility of the memory 89 and the content of the header H9 for generating as output the requests R1, R2, R3, R4 for access to the memory 89 and the word 206 for activating a write operation in the memory 89, during the high state of the first clock cycle CK1. The word 203 contains the availability status disp1 through disp16 of the cells of the memory 89 and the availability status L10 through L40 of the outgoing lines 10, 20, 30, 40.

A gate 501 indicates that the cell 111 is available (bit disp1) and that the line 10 is free (bit L10). A gate 505 indicates that the cell 112 is available (bit disp5) and that the line 20 is free (bit L20). A gate 509 indicates that the cell 113 is available (bit disp5) and that the line 30 is free (bit L30). A gate 513 indicates that the cell 114 is available (bit disp13) and that the line 40 is free (bit L40). A gate 517 indicates that the result of at least one gate 501, 505, 509, 513 is in the high state, i.e., that there is at least one cell available and accessible in the group of cells 111 through 114 corresponding to the output 49 through the read line 110 and the incoming line 1. A circuit 521 receives as input the result of each of the gates 501, 505, 509, 513 in order to retain as output no more than one high state among the outputs of the gates in accordance with a fixed order of priority, i.e., so that the block 521 retains no more than one cell and its access path in the memory 89. A logical switch 525 receives as input the n outputs from the circuit 521, no more than one of which is in the high state.

A gate 502 indicates that the cell 121 is available (bit disp2) and that the line 10 is free (bit (L10). A gate 506 indicates that the cell 122 is available (bit disp6) and that the line 20 is free (bit L20). A gate 510 indicates that the cell 123 is available (bit disp10) and that the line 30 is free (bit L30). A gate 514 indicates that the cell 124 is available (bit disp14) and that the line 40 is free (bit L40). A gate 518 indicates that the result of at least one gate 502, 506, 510, 514 is in the high state, i.e., that there is at least one cell available and accessible in the group of cells 121 through 124 corresponding to the output 59 through the read line 120 and the outgoing line 2. A circuit 522, identical to the circuit 521, receives as input the result of each of the gates 502, 506, 510, 514 in order to retain as output no more than one high state among the outputs of the gates in accordance with a fixed order of priority, i.e., so that the block 522 retains no more than one cell and its access path in the memory 89. A logical switch 526 receives as input the n outputs from the circuit 522, no more than one of which is in the high state.

A gate 503 indicates that the cell 131 is available (bit disp3) and that the line 10 is free (bit L10). A gate 507 indicates that the cell 132 is available (bit disp7) and that the line 20 is free (bit L20). A gate 511 indicates that the cell 133 is available (bit disp11) and that the line 30 is free (bit L30). A gate 515 indicates that the cell 134 is available (bit disp15) and that the line 40 is free (bit L40). A gate 519 indicates that the result of at least one gate 503, 507, 511, 515 is in the high state, i.e., that there is at least one cell available and accessible in the group of cells 131 through 134 corresponding to the output 69 through the read line 130 and the incoming line 3. A circuit 523, identical to the circuit 521, receives as input the result of each of the gates 503, 507, 511, 515 in order to retain as output no more than one high state among the outputs of the gates in accordance with a fixed order of priority, i.e., so that the block 523 retains no more than one cell and its access path in the memory 89. A logical switch 527 receives as input the n outputs from the circuit 523, no more than one of which is in the high state.

A gate 504 indicates that the cell 141 is available (bit disp4) and that the line 10 is free (bit L10). A gate 508 indicates that the cell 142 is available (bit disp8) and that the line 20 is free (bit (L20). A gate 512 indicates that the cell 143 is available (bit disp12) and that the line 30 is free (bit L30). A gate 516 indicates that the cell 144 is available (bit disp16) and that the line 40 is free (bit (L40). A gate 520 indicates that the result of at least one gate 504, 508, 512, 516 is in the high state, i.e., that there is at least one cell available and accessible in the group of cells 141 through 144 corresponding to the output 79 through the read line 140 and the incoming line 4. A circuit 524, identical to the circuit 521, receives as input the result of each of the gates 504, 508, 512, 516 in order to retain as output no more than one high state among the outputs of the gates in accordance with a fixed order of priority, i.e. so that the block 528 retains no more than one cell and its access path in the memory 89. A logical switch 528 receives as input the n outputs from the circuit 524, no more than one of which is in the high state.

A gate 529 generates a high state whose destination is a circuit 533 when the header H9 indicates the output 49 to be the destination of the packet presented in the input 9, and when there is at least one cell of the memory 89 corresponding to the output 49 indicated to be available and accessible by the gate 517.

A gate 530 generates a high state whose destination is the circuit 533 when the header H9 indicates the output 59 to be the destination of the packet presented in the input 9 and when there is at least one cell of the memory 89 corresponding to the output 59 indicated to be available and accessible by the gate 518.

A gate 531 generates a high state whose destination is the circuit 533 when the header H9 indicates the output 69 to be the destination of the packet presented in the input 9, and when there is at least one cell of the memory 89 corresponding to the output 69 indicated to be available and accessible by the gate 519.

A gate 532 generates a high state whose destination is the circuit 533 when the header H9 indicates the output 79 to be the destination of the packet presented in the input 9 and when there is at least one cell of the memory 89 corresponding to the output 79 indicated to be available and accessible by the gate 520.

A circuit 533 transfers the result of each of the n gates 529 through 532 to the input of a gate 537, 538, 539, 540, retaining no more than one high state among them. The circuit 533 thus selects no more than one group of cells of the memory 89 corresponding to a destination output proposed by the header H9. To do this, the circuit 533 may be controlled by signals 534, 535, 536 issuing from the header H9.

Each of the gates 537 through 540 also receives as input the complementary state of the bit of the signal A12 corresponding to the input 9 considered here. The n gates 537 through 540 thus validate a high state retained by the circuit 533 if and only if the bit of the signal A12 is not in the high state, i.e., if the input 9 has not been retained by the block 202 of the device OC1. In order for the state of the bit of the signal A12 to be established, the validation by the gates 537 through 539 is performed during a clock cycle state that follows the high state of the first clock cycle CK1. The output of each gate 537, 538, 539, 540 constitutes the bit of the word 206 respectively corresponding to a request to write into the group of cells 111 through 114, 121 through 124, 131 through 134, 141 through 144.

At most one of the bits of the word 206 set to the high state by the circuit 533 closes at most one of the switches 525 through 526 corresponding to this bit. The switch 525 is closed by the bit corresponding to the output 49. The switch 526 is closed by the bit corresponding to the output 59. The switch 527 is closed by the bit corresponding to the output 69. The switch 528 is closed by the bit corresponding to the output 79. Thus, the state of each of the n bits resulting from the circuit 521, 522, 523, 524 corresponding to the closed switch 525, 526, 527, 528 is respectively retranscribed into each of the n request signals R1 through R4.

The preceding explanations are also valid for each of the inputs 19, 29, 39, replacing the header H9 with the respective header H19, H29, H39 and the word 206 with the respective word 216, 226, 236.

The processing of the word 203 by a first set of components constituted by the gates 501 through 520 and the circuits 521 through 524 is identical for all the inputs of the router. It is possible to combine these components in a common function and to distribute the signals generated to a second set of components constituted by the gates 529 through 532, the switches 525 through 528, and the circuit 533 that is specific to each input. The second set is duplicated identically in each block 204, 214, 224, 234. A duplication of the first set of components in each block 204, 214, 224, 234 makes it possible to reduce the number of connections between blocks.

It is noted that each of the cells of the memory 89 is accessible through each input independently.

Figure 7:
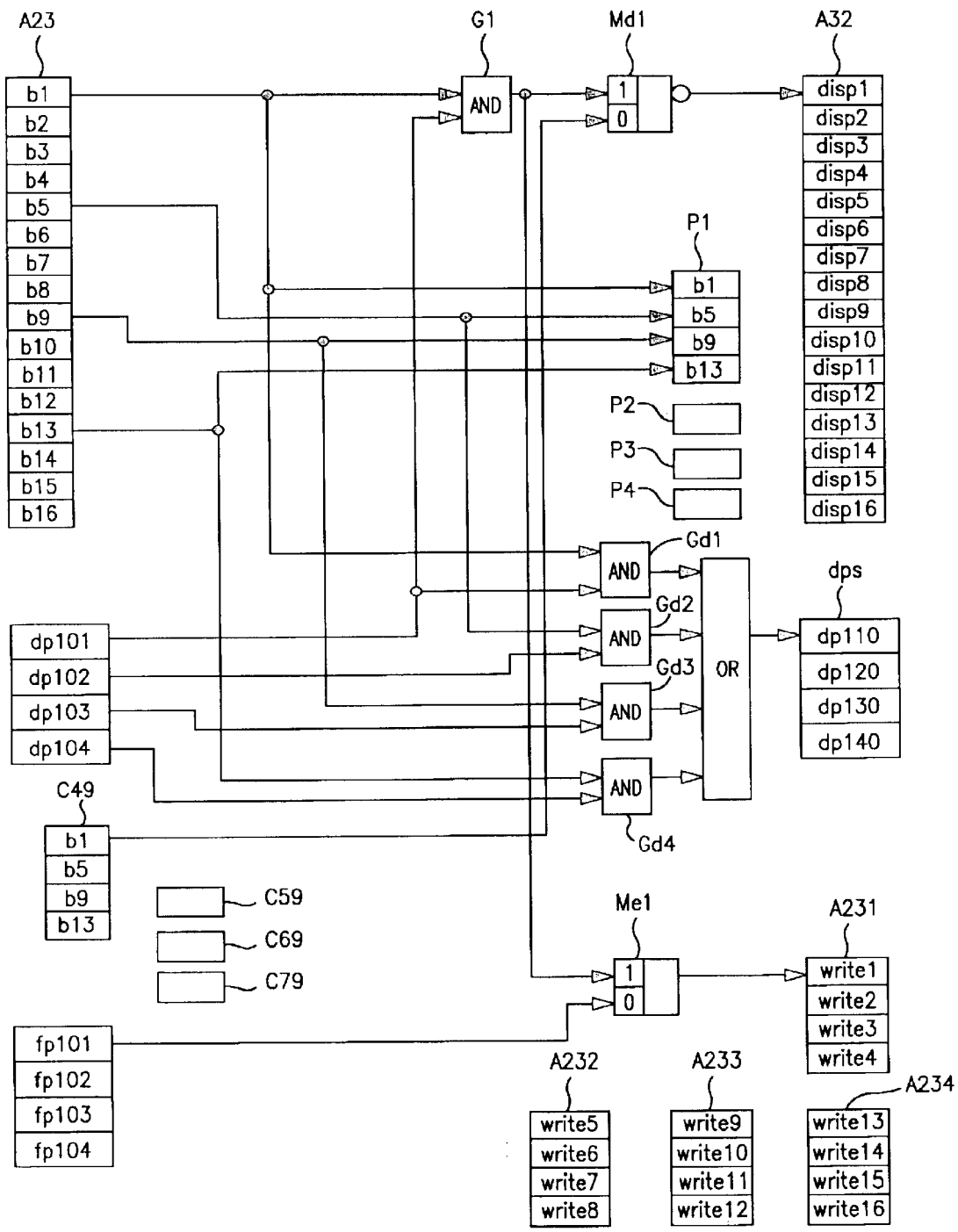
FIG. 7 represents a third device for generating write commands in the accumulator memory.

FIG. 7 is a schematic representation of the third device OC3, simplified in order not to unnecessarily overload the figure with all the repeated elements of the circuit similar to those represented. The device OC3 receives the signal A23 in the form of a word of n times n bits, for example b1 through b16 when n is equal to four, and n signals of n bits C49, C59, C69, 79, whose generation by the device OC4 is explained in reference to FIG. 4. In addition, the device OC3 detects each start-of-packet dp101 and each end-of-packet fp101 flowing through the line 101, each start of packet dp102 and each end-of-packet fp102 flowing through the line 102, each start-of-packet dp103 and each end-of-packet fp103 flowing through the line 103, and each start-of-packet dp104 and each end-of-packet fp104 flowing through the line 104.

The device OC3 generates n signals A231, A232, A233, A234, which activate a write operation into the memory 89 from each of the respective lines 101, 102, 103, 104. In addition, the device OC3 informs the device OC2 of the availability of the cells of the memory 89 by means of the signal A32, informs the device OC4 of the order of writing into the memory 89 by means of n n-bit signals P1, P2, P3, P4 and a start-of-packet signal dps.

In the signal A23, each of the n bits b1 through b4 indicates a reservation of a respective cell 111, 121, 131, 141, each of the n bits b5 through b8 indicates a reservation of a respective cell 112, 122, 132, 142, each of the n bits b9 through b12 indicates a reservation of a respective cell 113, 123, 133, 143, and each of the n bits b13 through b16 indicates a reservation of a respective cell 114, 124, 134, 144.

A logical combination of the bit b1 of the signal A23 and of the detection of the start-of-packet dp101 obtained by means of a gate G1, indicates that the cell 111 has been reserved and that a packet has begun to flow through the line 101. A setting of a bit write1 to the high state for the signal A231 initiates a write operation into the cell 111 of the packet flowing through the line 101. This writing is automatically maintained by a flip-flop Me1 until the detection of an end-of-packet fp101 on the line 101.

Similarly, a logical combination of the bit b2, b3, b4 of the signal A23 and of the detection of an end-of-packet dp101 indicates that the respective cell 121, 131, 141 has been reserved and that a packet has begun to flow through the line 101. A setting of a respective bit write2, write3, write4 to the high state for the signal A231 initiates a write operation into the respective cell 121, 131, 141 of the packet flowing through the line 101. Each write operation is automatically maintained by a flip-flop identical to the flip-flop Me1 until the detection of an end of packet fp101 on the line 101.

The preceding explanations and the structure of the associated circuit for the signal A231 are also valid for the signals A232, A233, A234, respectively replacing the bits b1 through b4 with the bits b5 through 58, the bits b9 through b12, the bits b13 through b16 relative to the signal A23, respectively replacing the line 101 with the line 102, the line 103, the line 104, respectively replacing the detection of the start- and end-of-packet dp101 and fp101 with the start- and end-of-packet dp102 and fp102, dp103 and fp103, dp104 and fp104, respectively replacing the cells 111, 121, 131, 141 with the cells 112, 122, 132, 142, the cells 113, 123, 133, 143, the cells 114, 124, 134, 144. Each of the n bits write5 through write8 of the signal A232, the n bits write9 through write12 of the signal A233, the n bits write13 through write16 of the signal A234, is associated with a respective gate and flip-flop identical to the gate G1 and the flip-flop Me1.

As explained below in reference to FIG. 8, the signal C49 is constituted by a prior state of n bits b1, b5, b9, b13 for activating a reading of a cell in the group of cells 111 through 114. Likewise, the signals C59, C69, C79 are respectively constituted by a prior state of n bits b2, b6, b10, b14 for activating a reading of a cell in the group of cells 121 through 124, a prior state of n bits b3, b7, b11, b15 for activating a reading of a cell in the group of cells 131 through 134, a prior state of n bits b4, b8, b12, b16 for activating a reading of a cell in the group of cells 141 through 144.

A setting of a bit disp1 of the signal A32 to the high state informs the device OC2 that the cell 111 is available to accumulate a packet to be transmitted. The state of this bit is the complementary state of the logical combination obtained by means of the gate G1. This complementary state is automatically maintained in priority fashion by a flip-flop Md1. The flip-flop Md1 is reset to zero by the bit b1 of the signal C49. This has the effect of declaring the cell 111 available again as soon as a reading of it has begun, thus allowing packet traffic of the wormhole type.

The n times n signals disp1 through disp16 are obtained as explained above for the n bits b1 through b16. The circuit therefore comprises n times n flip-flops identical to the flip-flop Md1.

The device OC3 retranscribes the bits b1, b5, b9, b13 issuing from the signal A23 into the signal P1, whose destination is the device OC4. Likewise, the device OC3 retranscribes the bits b2, b6, b10, b14 issuing from the signal A23 into the signal P2, the bits b3, b7, b11, b15 issuing from the signal A23 into the signal P2, the bits b4, b8, b12, and b16 issuing from the signal A23 into the signal P4.

A setting of a bit dp110 of the signal dps to a high state indicates a start-of-packet detected by a cell of the group of n cells 111 through 114. The signal dp110 is generated by an OR gate that receives as input the outputs of n gates Gd1, Gd2, Gd3, Gd4. The output of the gate Gd1 is in the high state when the bit b1 of the signal A23 and the signal dp101 are in the high state, the output of the gate Gd2 is in the high state when the bit b5 of the signal A23 and the signal dp102 are in the high state, the output of the gate Gd3 is in the high state when the bit b9 of the signal A23 and the signal dp103 are in the high state, the output of the gate Gd4 is in the high state when the bit b13 of the signal A23 and the signal dp104 are in the high state.

The above explanations are also valid for the signals dp120, dp130, dp140, replacing the bits b1, b5, b9, b13 relative to the signal A23 respectively with the bits b2, b6, b10, b14, with the bits b3, b7, b11, b15, with the bits b4, b8, b12, b16 relative to the signal A23. The circuit of the device OC3 comprises n OR gates identical to the one represented in FIG. 7, and n times n gates identical to the gates Gd1 through Gd4 represented in FIG. 7.

Figure 8:
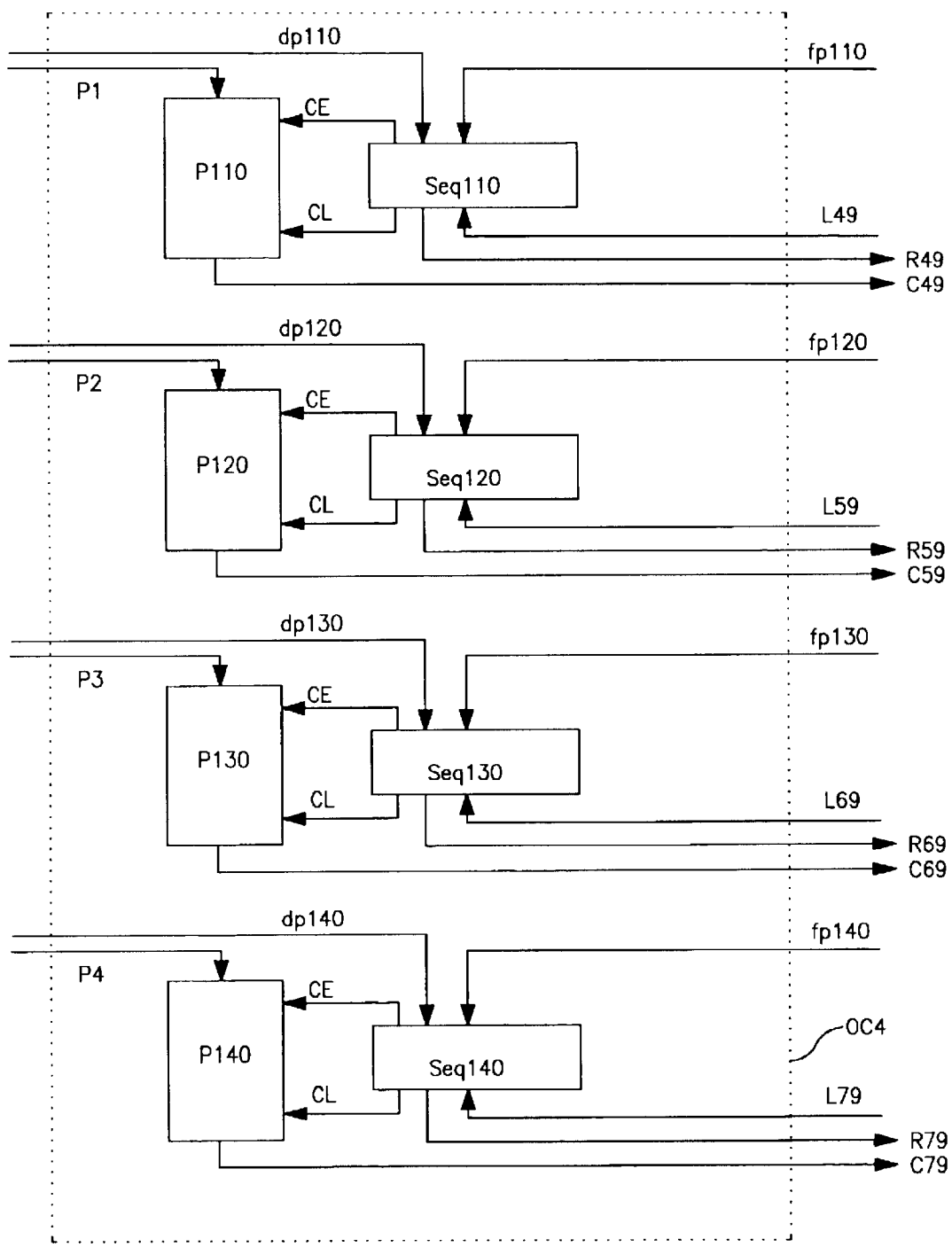
FIG. 8 represents a fourth device for generating read commands in the accumulator memory.

Referring to FIG. 8, the device OC4 comprises a number n of stacks P110, P120, P130, P140, each associated with a respective sequencer Seq110, Seq120, Seq130, Seq140. For each stack P110, P120, P130, P140, the respective sequencer Seq110, Seq120, Seq130, Seq140 has two pointers CE and CL. The pointer CE is used to activate a write operation in the respective stack P110, P120, P130, P140. The pointer CL is used to activate a read operation in the respective stack P110, P120, P130, P140. The pointers CE and CL are initialized with the first address of the stack in question. The pointer CE is incremented after each write operation. The pointer CL is incremented after each read operation. The stack in question is recognized to be empty when the value of the pointer CL is, for example, equal to the value of the pointer CE. The read operations in the stack in question thus keep to the order of the write operations.

When the sequencer Seq110 receives the signal dp110, it initiates a writing of the value of the signal P1 into the stack P110 by means of the pointer CE. As long as the stack P110 is not empty, the sequencer Seq110 sends a signal R49 whose destination is the device OC1. The signal R49 requests a reservation of the output 49 and consequently modifies the value of the word 201. This has the effect of giving priority to the request or requests to transfer packets to the output from the memory 89 over the transfer requests issuing from the inputs of the router. As soon as the sequencer Seq110 receives a signal L49 issuing from the device OC1, it initiates a reading of the stack P110 by means of the pointer CL. The signal L49 indicates that the output 49 is free to receive data packets. The reading of the stack P110 generates a signal C49, which activates a reading of the cell 111, 112, 113, 114 addressed by the value of the signal P1 read in the stack in question. When the sequencer Seq110 detects an end-of-packet fp110 in the line 110, it initiates a new reading of the stack P110 until the latter is empty. The reading of each cell 111, 112, 113, 114 transfers its content to the line 110, and as a result of the means constituted here by the stack P110 and the sequencer Seq110, does so in the order of activation of the writing in the cells by the signals A231, A232, A233, A234.

Likewise, when the sequencer Seq120 receives the signal dp120, it initiates a writing of the value of the signal P2 in the stack P120 by means of the pointer CE. As long as the stack P120 is not empty, the sequencer Seq120 sends a signal R59 whose destination is the device OC1. The signal R59 requests a reservation of the output 59. As soon as the sequencer Seq120 receives a signal L59 issuing from the device OC1, it initiates a reading of the stack P120 by means of the pointer CL. The reading of the stack P120 generates a signal C59 that activates a reading of the one of the n cells 121 through 124 addressed by the value of the signal P2 read in the stack in question. When the sequencer Seq120 detects an end-of-packet fp120 on the line 120, it initiates a new reading of the stack P120 until the latter is empty. The reading of cells among the cells 121 through 124 transfers their contents to the line 120, and as a result of the means constituted here by the stack P120 and the sequencer Seq120, does so in the order of activation of the writing in the cells by the signals A231, A232, A233, A234.

Likewise, when the sequencer Seq130, Seq140 reads the signal dp130, dp140, it initiates a writing of the value of the signal P3, P4 into the stack P130, P140 by means of the pointer CE. As long as the stack P130, P140 is not empty, the sequencer Seq130, Seq140 sends a signal R69, R79 whose destination is the device OC1. The signal R69, R79 requests a reservation of the output 69, 79. As soon as the sequencer Seq130, Seq140 receives a signal L69, L79 issuing from the device OC1, it initiates a reading of the stack P130, P140 by means of the pointer CL. The reading of the stack P130, P140 generates a signal C69, C79 that activates a reading of the one of the n cells 131 through 134, 141 through 144 addressed by the value of the signal P3, P4 read in the stack in question. When the sequencer Seq130, Seq140 detects an end-of-packet fp130, fp140 on the line 130, 140, it initiates a new reading of the stack P130, P140 until the latter is empty. The reading of cells among the cells 131 through 134, 141 through 144 transfers their contents to the line 130, 140, and as a result of the means constituted here by the stack P130, P140 and the sequencer Seq130, Seq140, does so in the order of activation of the writing in the cells by the signals A231, A232, A233, A234.

The order of the reading through each of the n read lines 110, 120, 130, 140 of the memory 89 conforms to the order of the writing through each of the write lines 101, 102, 103, 104. By keeping to the order of arrival of the packets, the accumulator memory 89 favors the packet that has had the longest wait time, thus minimizing the latency between a packet's insertion into and extraction from the memory 89. Each group of n cells 111 through 114, 121 through 124, 131 through 134, 141 through 144 constitutes a queue wherein the first packet in is the first packet out. Each queue is dedicated to an output 49, 59, 69, 79.

Each group of n cells has a number n of independent write accesses through the lines 101 through 104, equal to the number n of inputs 9, 19, 29, 39. The result is that each input of the router, for example the input 9, has at least one access to each queue dedicated to an output and constituted by a group of cells. The cells of the same queue are equivalent and are not sequenced; when several cells are available and accessible, the choice of a cell can be made, for example, by means of a fixed priority mechanism such as: cell 114 higher priority than cell 113 higher priority than cell 112 higher priority than cell 111. If the accessible cells of a group of cells are not available, the queue is considered to be full and it prevents the presentation of a new packet through the input 9. However, a packet is only blocked at an input of the router by a packet that is intended for the same output, i.e., in the queue dedicated to this output. Each group of cells therefore constitutes, with the associated output, an output buffer of the router.

Figure 9:
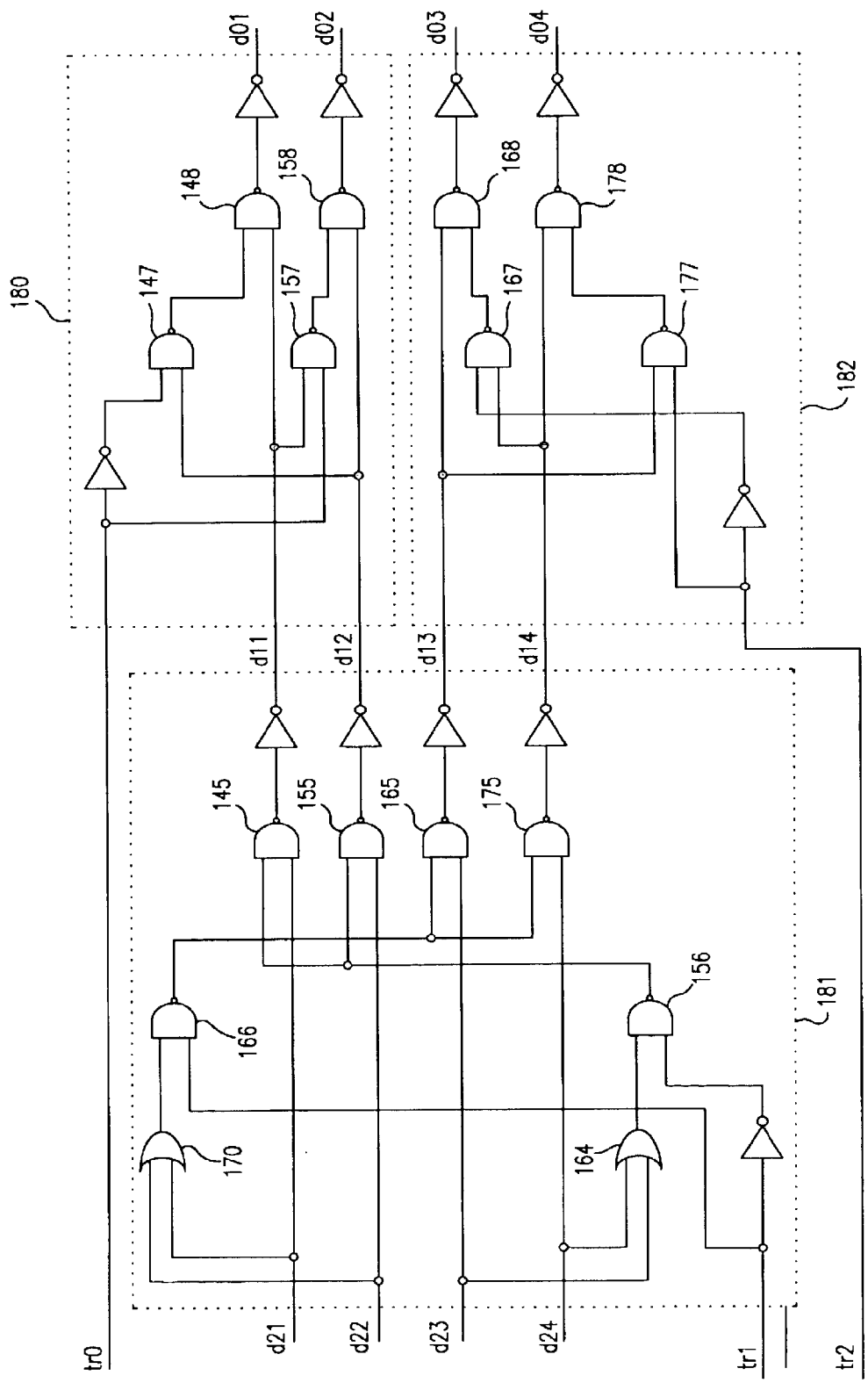
FIGS. 9 and 10 represent arbitration circuits.

FIG. 9 represents an arbitration circuit that receives four signals d21, d22, d23, d24 as input and generates four signals d01, d02, d03, d04 as output, controlled by a signal of three-bits tr0, tr1, tr2. A functional subsystem 180 is controlled by the bit tr0. A functional subsystem 181 is controlled by the bit tr1. A functional subsystem 182 is controlled by the bit tr2.

The subsystem 180 generates the signals d01 and d02 from two signals d11 and d12 generated by the subsystem 181. The output of a gate 147 is in the high state when the signal d12 is in the low state or when the bit tr0 is in the high state. The signal d01 is in the high state when the two inputs of a gate 148 are in the high state, i.e., when the signal d11 is in the high state and the bit tr0 is in the high state, or the signal d21 is in the low state. The output of a gate 157 is in the high state when the signal d11 is in the low state or when the bit tr0 is in the low state. The signal d02 is in the high state when the two inputs of a gate 158 are in the high state, i.e., when the signal d12 is in the high state and the bit tr0 is in the low state or the signal d11 is in the low state. Thus, if the two signals d11 and d12 are in the high state, only the signal d01 is in the high state if the bit tr0 is in the high state and only the signal d02 is in the high state if the bit tr0 is in the low state.

The subsystem 182 generates the signals d03 and d04 from two signals d13 and d14 generated by the subsystem 181. The output of a gate 167 is in the high state when the signal d14 is in the low state or when the bit tr2 is in the high state. The signal d04 is in the high state when the two inputs of a gate 168 are in the high state, i.e., when the signal d13 is in the high state and the bit tr2 is in the high state or the signal d14 is in the low state. The output of a gate 177 is in the high state when the signal d13 is in the low state or when the bit tr2 is in the high state. The signal d04 is in the high state when the two inputs of a gate 178 are in the high state, i.e., when the signal d14 is in the high state and the bit tr2 is in the low state or the signal d13 is in the low state. Thus, if the two signals d13 and d14 are in the high state, only signal d03 is in the high state if the bit tr2 is in the high state and only the signal d04 is in the high state if the bit tr2 is in the low state.

The subsystem 181 generates the signals d11, d12, d13, d14 from the signals d21, d22, d23, d24. The output of a gate 156 is in the high state when the output of a gate 164 is in the low state or when the bit tr1 is in the high state. The output of the gate 164 is in the low state if the signals d23 and d24 are in the low state. The signal d11 is in the high state when the two inputs of a gate 145 are in the high state, i.e., when the signal d21 is in the high state and the bit tr1 is in the high state or the signals d23 and d24 are in the low state. The signal d12 is in the high state when the two inputs of a gate 155 are in the high state, i.e., when the signal d22 is in the high state and the bit tr1 is in the high state or the signals d23 and d24 are in the low state. The output of a gate 166 is in the high state when the output of a gate 170 is in the low state or when the bit tr1 is in the low state. The output of the gate 170 is in the low state if the signals d21 and d22 are in the low state. The signal d13 is in the high state when the two inputs of a gate 165 are in the high state, i.e., when the signal d23 is in the high state and the bit tr1 is in the low state or the signals d21 and d22 are in the low state. The signal d14 is in the high state when the two inputs of a gate 175 are in the high state, i.e., when the signal d24 is in the high state and the bit tr1 is in the low state or the signals d21 and d22 are in the low state. Thus, if the four signals d21, d22, d23, d24 are in the high state, only the signals d11, d12 are in the high state if the bit tr1 is in the high state and only the signals d13, d14 are in the high state if the bit tr1 is in the low state.

The result of the combination of the subsystems 180 through 182 of the arbitration circuit in reference to FIG. 9 is that no more than one of the signals d01 through d04 is in the high state when at least one of the signals d21 through d24 is in the high state. The order of priority for retaining a high state results from the state of the bits tr0, tr1, tr2. The high state of the signals d21, d22 has priority over the high state of the signals d23, d24 if the bit tr1 is in the high state and vice versa. The high state of the signal d21 has priority over the high state of the signal d22 if the bit tr0 is in the high state, and vice versa. The high state of the signal d23 has priority over the high state of the signal d24 if the bit tr2 is in the high state and vice versa.

Figure 10:
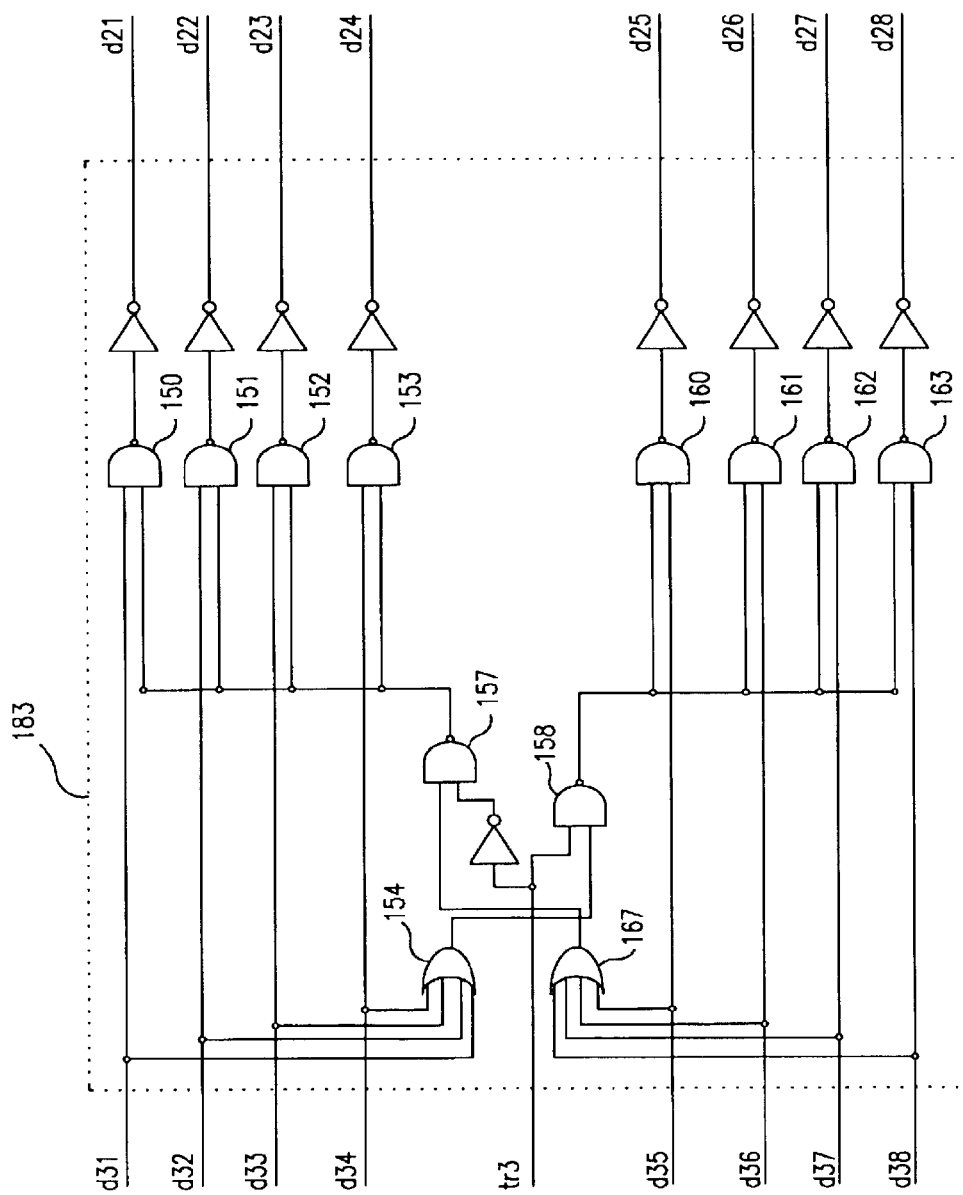

The preceding teaching in reference to FIG. 9 for a number n of signals d21 through d24 equal to 4 can be extended to a number n of signals d31 through d38 equal to eight in reference to FIG. 10. The arbitration circuit in this case also comprises a functional subsystem 183 controlled by a bit tr3 for generating signals d21 through d28 from signals d31 through d38. The signals d21 through d24 are transmitted to the functional subsystem 181 of FIG. 9. The arbitration circuit therefore also comprises functional subsystems 184, 185, 186, respectively identically to the functional subsystems 180, 181, 182 and respectively controlled by bits tr4, tr5, tr6 for generating signals d05, d06, d07, d08. The corresponding references in FIG. 9 need only be replaced in order to obtain a representation of the arbitration circuit. The signals d25 through d28 are transmitted to the subsystem 184.

The output of a gate 157 is in the high state when the output of a gate 167 is in the low state or when the bit tr3 is in the high state. The output of the gate 167 is in the low state if the signals d35, d36, d37, d38 are in the low state. The signal d21 is in the high state when the two inputs of a gate 150 are in the high state, i.e., when the signal d31 is in the high state and the bit tr3 is in the high state or the signals d35 through d38 are all in the low state. The signal d22 is in the high state when the two inputs of a gate 151 are in the high state, i.e., when the signal d32 is in the high state and the bit tr3 is in the high state or the signals d35 through d38 are all in the low state. The signal d33 is in the high state when the two inputs of a gate 152 are in the high state, i.e., when the signal d33 is in the high state and the bit tr3 is in the high state or the signals d35 through d38 are all in the low state. The signal d24 is in the high state when the two inputs of a gate 153 are in the high state, i.e., when the signal d34 is in the high state and the bit tr3 is in the high state or the signals d35 through d38 are all in the low state. The output of a gate 168 is in the high state when the output of a gate 154 is in the low state or when the bit tr3 is in the low state. The output of the gate 154 is in the low state if the signals d31, d32, d33 and d34 are in the low state. The signal d25 is in the high state when the two inputs of a gate 160 are in the high state, i.e., when the signal d35 is in the high state and the bit tr3 is in the low state or the signals d31 through d35 are all in the low state. The signal d26 is in the high state when the two inputs of a gate 161 are in the high state, i.e., when the signal d36 is in the high state and the bit tr3 is in the low state or the signals d31 through d34 are all in the low state. The signal d27 is in the high state when the two inputs of a gate 162 are in the high state, i.e., when the signal d37 is in the high state and the bit tr3 is in the low state or the signals d31 through d34 are all in the low state. The signal d28 is in the high state when the two inputs of a gate 163 are in the high state, i.e., when the signal d38 is in the high state and the bit tr3 is in the low state or the signals d31 through d34 are all in the low state. Thus, if the eight signals d31, d32, d33, d34, d35, d36, d37, d38 are in the high state, only the signals d21, d22, d23, d24 are in the high state if the bit tr3 is in the high state and only the signals d25, d26, d27 d28 are in the high state if the bit tr3 is in the low state.

The order of priority for retaining a high state results from the state of the bits tr0, tr1, tr2, tr3, tr4, tr5, tr6. The high state of the signals d31 through d34 has priority over the high state of the signals d35 through d38 if the bit tr3 is in the high state and vice versa.

The blocks 240, 250, 260, 270 of the device OC1 in this case are circuits with four inputs. They are therefore each constituted by an arbitration circuit like the one explained in reference to FIG. 9. The bits tr0, tr1, tr2 are produced by the counter 241 for the block 240, by the counter 251 for the block 250, by the counter 261 for the block 260, by the counter 271 for the block 270.

The blocks 205, 215, 225, 235 of the device OC2 in this case are circuits with four inputs. They are therefore each constituted by an arbitration circuit like the one explained in reference to FIG. 9. The bits tr0, tr1, tr2 are produced by the counter 207 is for the block 205, by the counter 217 for the block 207, by the counter 227 for the block 225, by the counter 237 for the block 235.

The circuits 521, 522, 523, 524 of the device OC2 in this case are circuits with four inputs. They are therefore each constituted by an arbitration circuit like the one explained in reference to FIG. 9. The bits tr0, tr1, tr2 are set, for example to a low state, which results in a fixed order of priority of the high states of the inputs.

The circuit 533 of the device OC2 in this case is a circuit with four inputs. It is therefore constituted by an arbitration circuit like the one explained in reference to FIG. 9. The values of the bits tr0, tr1, tr2 are respectively equal to the values of the signals 534, 535, 536.

Figure 11:
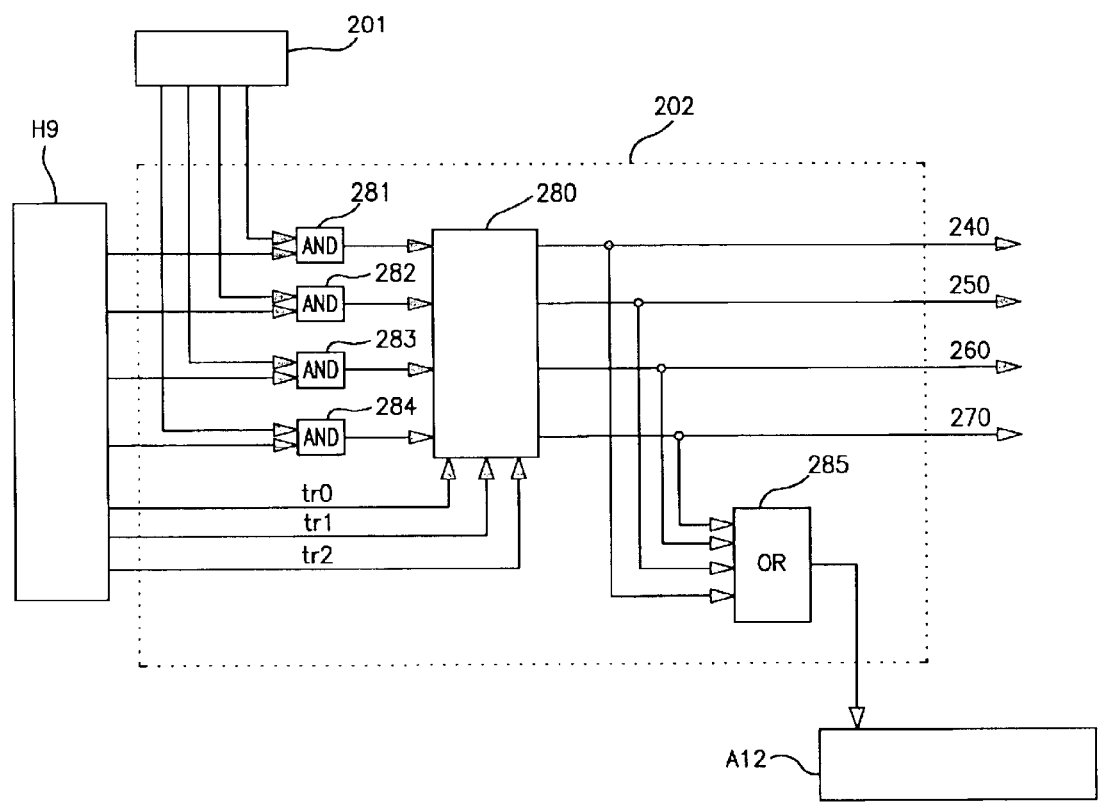
FIG. 11 represents additional details of the first device.

Referring to FIG. 11, the block 202 comprises, in the present case in which n is equal to four, an arbitration circuit 280 like the arbitration circuit explained in reference to FIG. 9. The circuit 280 receives as input the output of a gate 281, the output of a gate 282, the output of a gate 283 and the output of a gate 284. The output of the gate 281 is in the high state if the output 49 of the router is proposed in the header H9 of the packet to be transferred and if the bit of the word 201 corresponding to the availability of the output 49 is in the high state. The output of the gate 282 is in the high state if the output 59 of the router is proposed in the header H9 of the packet to be transferred and if the bit of the word 201 corresponding to the availability of the output 59 is in the high state. The output of the gate 283 is in the high state if the output 69 of the router is proposed in the header H9 of the packet to be transferred and if the bit of the word 201 corresponding to the availability of the output 69 is in the high state. The output of the gate 281 is in the high state if the output 79 of the router is proposed in the header H9 of the packet to be transferred and if the bit of the word 201 corresponding to the availability of the output 79 is in the high state.

The signals tr0, tr1, tr2 for controlling the circuit 280 are provided by the header H9. By retaining only one high state, if one exists, among those of the outputs of the gates 281 through 284, the circuit 280 sends the output state of the gate 281 to the block 240, the output state of the gate 282 to the block 250, the output state of the gate 283 to the block 260, the output state of the gate 284 to the block 270. Thus, no more than one output among the output or outputs proposed by the header H9 that is or are available is selected by the block 202.

The output of a gate 285 is in the high state if an output of the circuit 280 is in the high state. The high state of the output of the gate 285 indicates that an output of the router has been assigned to the input 9 by the block 202. The output of the gate 285 is written into the bit of the word A12 corresponding to the input 9.

While this invention has been described in conjunction with specific embodiments thereof, it is evident that may alternatives, modifications and variations will be apparent to those skilled in the art. Accordingly, the preferred embodiments of the invention as set forth herein, are intended to be illustrative, not limiting. Various changes may be made without departing from the true spirit and full scope of the invention as set forth herein and defined in the claims.

What is claimed is:

1. A router comprising a number (n) of inputs (9, 19, 29, 39) and a number (n) of outputs (49, 59, 69, 79) for routing data packets from the inputs (9, 19, 29, 39) to the outputs (49, 59, 69, 79), comprising:
   a reticular routing switch constituted by a number (n) of first incoming lines (5, 6, 7, 8), a number (n) of second incoming lines (1, 2, 3, 4), a number (n) of first outgoing lines (50, 60, 70, 80) and a number (n) of second outgoing lines (10, 20, 30, 40), each of the first incoming lines (5, 6, 7, 8) being respectively connected to an input (9, 19, 29, 39) and each of the first outgoing lines (50, 60, 70, 80) being respectively connected to an output (49, 59, 69, 79) and switchable to any of the incoming lines (1, 2, 3, 4, 5, 6, 7, 8);
   a memory (89) comprising a number (n) of write lines (101, 102, 103, 104), each connected to one of the second outgoing lines (10, 20, 30, 40), a number (n) of read lines (110, 120, 130, 140), each connected to one of the second incoming lines (1, 2, 3, 4,) and a number (n) of groups (n) of cells (111, 112, 113, 114), (121, 122, 123, 124), (131, 132, 133, 134), (141, 142, 143, 144);
   each read line (110) configured to allow an extraction of a packet contained in a group of (n) cells (111 through 114); and
   each write line (101) configured to allow an insertion of a packet into one of the cells (111, 121, 131, 141) of each group of (n) cells.

2. The router according to claim 1, wherein the insertion of a packet into one of said cells through the write line (101) is controlled by an outgoing line (209) of a reticular control switch having (n) incoming lines (208, 218, 228, 238) and (n) outputs (209, 219, 229, 239) wherein switching to one of the control switch (n) incoming lines (208, 218, 228, 238) is controlled by a signal (C1), each incoming line (208, 218, 228, 238) conveying a value of a word (206, 216, 226, 236) of (n) bits wherein a bit position corresponds to a group of cells, each word (206, 216, 226, 236) being associated with an input (9, 19, 29, 39) of the router.

3. The router according to claim 2, wherein the extraction of a packet contained in a group of (n) cells (111 through 114) is sequentially controlled by a signal (C49) extracted from a stack (P110) in such a way that the state of the extracted signal (C49) is equal to the state of the earliest signal (P1) inserted into the stack (P110), the state of the earliest signal (P1) indexing a cell (111, 112, 113, 114) and the signal (P1) being inserted into the stack (P110) at the moment an insertion of a packet into said indexed cell begins.

4. The router according to claim 2, further comprising a first control device (OC1) for initiating, during a first clock cycle (CK1), a switching of one of the first and second (n) incoming lines (1 through 8) to one of the n outgoing lines (50, 60, 70, 80) corresponding to the output (49, 59, 69, 79) to which a data packet is to be routed if said output (49, 59, 69, 79) is available.

5. The router according to claim 4, comprising a second control device (OC2) for initiating, during a second clock cycle (CK2), a switching of one of the (n) incoming lines (5 through 8), corresponding to an input (9, 19, 29, 39) to one of the outgoing lines (10, 20, 30, 49), to the memory (89) for which there is an accessible cell in the group of cells corresponding to the output (49, 59, 69, 79) to which a data packet is to be routed if said output (49, 59, 69, 79) is not available.

6. The router according to claim 5, wherein the first control device (OC1) comprises for each input (9, 19, 29, 39) a first combinational block (202, 212, 222, 232) for defining, during a high state of the first clock cycle (CK1), the available output (49, 59, 69, 79), if one exists, to which to route the data packet arriving through said input (9, 19, 29, 39) as long as the corresponding incoming line (5, 6, 7, 8) has not been switched to an outgoing line (10, 20, 30, 40, 50, 60, 70).

7. The router according to claim 6, wherein the second control device (OC2) comprises for each input (9, 19, 29, 39) a second combinational block (204, 214, 224, 234) for defining, during a high state of the first clock cycle (CK1), a request (R1, R2, R3, R4) to access the memory (89) corresponding to the output (49, 59, 69, 79) to which the data packet arriving in said input (9, 19, 29, 39) is to be routed, for which there is an available cell in the memory (89), as long as the corresponding incoming line (5, 6, 7, 8) has not been switched to an outgoing line (10, 20, 30, 40, 50, 60, 70).

8. The router according to claim 7, wherein the first combinational block (202, 212, 222, 232), during the high state of the first clock cycle (CK1), sets an output availability bit of signal (A12) to a high state in order to indicate that an available output has been defined for the corresponding input (9, 19, 29, 39) and in that the second combinational block (204, 214, 224, 234), during a clock cycle state that follows the high state of the first clock cycle (CK1), validates the request (R1, R2, R3, R4) to access the memory (89).

9. The router according to claim 7, wherein the second control device (OC2) comprises, for each write input (101, 102, 103, 104) of the memory (89), an arbitration circuit (205, 215, 225, 235) for retaining, during the high state of a second clock cycle (CK2), no more than one of the inputs (9, 19, 29, 39), that requests to initiate a switching of the corresponding incoming line (5, 6, 7, 8) to the corresponding outgoing line (10, 20, 30, 40), in order to perform said switching.

10. The router according to claim 6, wherein the first combinational block (202, 212, 222, 232), during the high state of the first clock cycle (CK1), sets a bit of an output availability signal (A12) to a high state in order to indicate that an available output has been defined for the corresponding input (9, 19, 29, 39) and in that the second combinational block (204, 214, 224, 234), during a clock cycle state that follows the high state of the first clock cycle (CK1), validates the request (R1, R2, R3, R4) to access the memory (89).

11. The router according to claim 6, wherein the first control device (OC1) comprises for each output (49, 59, 69, 79) an arbitration circuit (240, 250, 260, 270) for retaining, during the low state of the first clock cycle (CK1), no more than one of the inputs (9, 19, 29, 39), that requests a switching of the corresponding incoming line (5, 6, 7, 8) to the corresponding outgoing line (50, 60, 70, 80), to be initiated in order to perform said switching in the absence of a switching request issuing from the memory (89).

12. The router according to claim 11, wherein the second control device (OC2) comprises, for each write input (101, 102, 103, 104) of the memory (89), an arbitration circuit (205, 215, 225, 235) for retaining, during the high state of a second clock cycle (CK2), no more than one of the inputs (9, 19, 29, 39), that requests to initiate a switching of the corresponding incoming line (5, 6, 7, 8) to the corresponding outgoing line (10, 20, 30, 40), in order to perform said switching.

13. The router according to claim 5, wherein the second control device (OC2) comprises for each input (9, 19, 29, 39) a second combinational block (204, 214, 224, 234) for defining, during a high state of the first clock cycle (CK1), a request (R1, R2, R3, R4) to access the memory (89) corresponding to the output (49, 59, 69, 79) to which the data packet arriving in said input (9, 19, 29, 39) is to be routed, for which there is an available cell in the memory (89), as long as the corresponding incoming line (5, 6, 7, 8) has not been switched to an outgoing line (10, 20, 30, 40, 50, 60, 70).

14. The router according to claim 13, wherein the first combinational block (202, 212, 222, 232), during the high state of the first clock cycle (CK1), sets a bit of an output availability signal (A12) to a high state in order to indicate that an available output has been defined for the corresponding input (9, 19, 29, 39) and in that the second combinational block (204, 214, 224, 234), during a clock cycle state that follows the high state of the first clock cycle (CK1), validates the request (R1, R2, R3, R4) to access the memory (89).

15. The router according to claim 13, wherein the second control device (OC2) comprises, for each write input (101, 102, 103, 104) of the memory (89), an arbitration circuit (205, 215, 225, 235) for retaining, during the high state of a second clock cycle (CK2), no more than one of the inputs (9, 19, 29, 39), that requests to initiate a switching of the corresponding incoming line (5, 6, 7, 8) to the corresponding outgoing line (10, 20, 30, 40), in order to perform said switching.

16. The router according to claim 4, wherein the first control device (OC1) comprises for each input (9, 19, 29, 39) a first combinational block (202, 212, 222, 232) for defining, during a high state of the first clock cycle (CK1), the available output (49, 59, 69, 79), if one exists, to which to route the data packet arriving through said input (9, 19, 29, 39) as long as the corresponding incoming line (5, 6, 7, 8) has not been switched to an outgoing line (10, 20, 30, 40, 50, 60, 70).

17. The router according to claim 16, wherein the second control device (OC2) comprises for each input (9, 19, 29, 39) a second combinational block (204, 214, 224, 234) for defining, during a high state of the first clock cycle (CK1), a request (R1, R2, R3, R4) to access the memory (89) corresponding to the output (49, 59, 69, 79) to which the data packet arriving in said input (9, 19, 29, 39) is to be routed, for which there is an available cell in the memory (89), as long as the corresponding incoming line (5, 6, 7, 8) has not been switched to an outgoing line (10, 20, 30, 40, 50, 60, 70).

18. The router according to claim 17, wherein the second control device (OC2) comprises, for each write input (101, 102, 103, 104) of the memory (89), an arbitration circuit (205, 215, 225, 235) for retaining, during the high state of a second clock cycle (CK2), no more than one of the inputs (9, 19, 29, 39), that requests to initiate a switching of the corresponding incoming line (5, 6, 7, 8) to the corresponding outgoing line (10, 20, 30, 40), in order to perform said switching.

19. The router according to claim 16, wherein the first control device (OC1) comprises for each output (49, 59, 69, 79) an arbitration circuit (240, 250, 260, 270) for retaining, during the low state of the first clock cycle (CK1), no more than one of the inputs (9, 19, 29, 39), that requests a switching of the corresponding incoming line (5, 6, 7, 8) to the corresponding outgoing line (50, 60, 70, 80), to be initiated in order to perform said switching in the absence of a switching request issuing from the memory (89).

20. The router according to claim 4, wherein the first control device (OC1) comprises for each output (49, 59, 69, 79) an arbitration circuit (240, 250, 260, 270) for retaining, during the low state of the first clock cycle (CK1), no more than one of the inputs (9, 19, 29, 39), that requests a switching of the corresponding incoming line (5, 6, 7, 8) to the corresponding outgoing line (50, 60, 70, 80), to be initiated in order to perform said switching in the absence of a switching request issuing from the memory (89).

21. The router according to claim 4, wherein the second control device (OC2) comprises, for each write input (101, 102, 103, 104) of the memory (89), an arbitration circuit (205, 215, 225, 235) for retaining, during the high state of a second clock cycle (CK2), no more than one of the inputs (9, 19, 29, 39), that requests to initiate a switching of the corresponding incoming line (5, 6, 7, 8) to the corresponding outgoing line (10, 20, 30, 40), in order to perform said switching.

22. The router according to claim 1 wherein the extraction of a packet contained in a group of (n) cells (111 through 114) is sequentially controlled by a signal (C49) extracted from a stack (P110) in such a way that the state of the extracted signal (C49) is equal to the state of the earliest signal (P1) inserted into the stack (P110), the state of the earliest signal (P1) indexing a cell (111, 112, 113, 114) and the earliest signal (P1) being inserted into the stack (P110) at the moment an insertion of a packet into said indexed cell begins.

23. The router according to claim 22, further comprising a first control device (OC1) for initiating, during a first clock cycle (CK1), a switching of one of the first and second (n)

incoming lines (1 through 8) to one of the n outgoing lines (50, 60, 70, 80) corresponding to the output (49, 59, 69, 79) to which a data packet is to be routed if said output (49, 59, 69, 79) is available.

24. The router according to claim 23, comprising a second control device (OC2) for initiating, during a second clock cycle (CK2), a switching of the one of the (n) incoming lines (5 through 8), corresponding to an input (9, 19, 29, 39) to one of the outgoing lines (10, 20, 30, 40) to the memory (89) for which there is an accessible cell in the group of cells corresponding to the output (49, 59, 69, 79) to which a data packet is to be routed if said output (49, 59, 69, 79) is not available.

25. The router according to claim 24, wherein the second control device (OC2) comprises for each input (9, 19, 29, 39) a second combinational block (204, 214, 224, 234) for defining, during a high state of the first clock cycle (CK1), a request (R1, R2, R3, R4) to access the memory (89) corresponding to the output (49, 59, 69, 79) to which the data packet arriving in said input (9, 19, 29, 39) is to be routed, for which there is an available cell in the memory (89), as long as the corresponding incoming line (5, 6, 7, 8) has not been switched to an outgoing line (10, 20, 30, 40, 50, 60, 70).

26. The router according to claim 25, wherein the first combinational block (202, 212, 222, 232), during the high state of the first clock cycle (CK1), sets a bit of an output availability signal (A12) to a high state in order to indicate that an available output has been defined for the corresponding input (9, 19, 29, 39) and in that the second combinational block (204, 214, 224, 234), during a clock cycle state that follows the high state of the first clock cycle (CK1), validates the request (R1, R2, R3, R4) to access the memory (89).

27. The router according to claim 23, wherein the first control device (OC1) comprises for each output (49, 59, 69, 79) an arbitration circuit (240, 250, 260, 270) for retaining, during the low state of the first clock cycle (CK1), no more than one of the inputs (9, 19, 29, 39), that requests a switching of the corresponding incoming line (5, 6, 7, 8) to the corresponding outgoing line (50, 60, 70, 80), to be initiated in order to perform said switching in the absence of a switching request issuing from the memory (89).

28. The router according to claim 23, wherein the second control device (OC2) comprises, for each write input (101, 102, 103, 104) of the memory (89), an arbitration circuit (205, 215, 225, 235) for retaining, during the high state of a second clock cycle (CK2), no more than one of the inputs (9, 19, 29, 39), that requests to initiate a switching of the corresponding incoming line (5, 6, 7, 8) to the corresponding outgoing line (10, 20, 30, 40), in order to perform said switching.

29. The router according to claim 1, further comprising a first control device (OC1) for initiating, during a first clock cycle (CK1), having a low state and a high state, a switching of one of the first and second (n) incoming lines (1 through 8) to one of the (n) outgoing lines (50, 60, 70, 80) corresponding to the output (49, 59, 69, 79) to which a data packet is to be routed if said output (49, 59, 69, 79) is available.

30. The router according to claim 29, comprising a second control device (OC2) for initiating, during a second clock cycle (CK2), a switching of one of the (n) incoming lines (5 through 8) corresponding to an input (9, 19, 29, 39) to one of the outgoing lines (10, 20, 30, 40), to the memory (89) for which there is an accessible cell in the group of cells corresponding to the output (49, 59, 69, 79) to which a data packet is to be routed if said output (49, 59, 69, 79) is not available.

31. The router according to claim 30, wherein the second control device (OC2) comprises for each input (9, 19, 29, 39) a second combinational block (204, 214, 224, 234) for defining, during a high state of the first clock cycle (CK1), a request (R1, R2, R3, R4) to access the memory (89) corresponding to the output (49, 59, 69, 79) to which the data packet arriving in said input (9, 19, 29, 39) is to be routed, for which there is an available cell in the memory (89), as long as the corresponding incoming line (5, 6, 7, 8) has not been switched to an outgoing line (10, 20, 30, 40, 50, 60, 70).

32. The router according to claim 31, wherein the first combinational block (202, 212, 222, 232), during the high state of the first clock cycle (CK1), sets a bit of an output availability signal (A12) to a high state in order to indicate that an available output has been defined for the corresponding input (9, 19, 29, 39) and in that the second combinational block (204, 214, 224, 234), during a clock cycle state that follows the high state of the first clock cycle (CK1), validates the request (R1, R2, R3, R4) to access the memory (89).

33. The router according to claim 31, wherein the second control device (OC2) comprises, for each write input (101, 102, 103, 104) of the memory (89), an arbitration circuit (205, 215, 225, 235) for retaining, during the high state of a second clock cycle (CK2), no more than one of the inputs (9, 19, 29, 39), that requests to initiate a switching of the corresponding incoming line (5, 6, 7, 8) to the corresponding outgoing line (10, 20, 30, 40), in order to perform said switching.

34. The router according to claim 30, wherein the second control device (OC2) comprises, for each write input (101, 102, 103, 104) of the memory (89), an arbitration circuit (205, 215, 225, 235) for retaining, during the high state of a second clock cycle (CK2), no more than one of the inputs (9, 19, 29, 39), that requests to initiate a switching of the corresponding incoming line (5, 6, 7, 8) to the corresponding outgoing line (10, 20, 30, 40), in order to perform said switching.

35. The router according to claim 29, wherein the first control device (OC1) comprises for each input (9, 19, 29, 39) a first combinational block (202, 212, 222, 232) for defining, during a high state of the first clock cycle (CK1), the available output (49, 59, 69, 79), if one exists, to which to route the data packet arriving through said input (9, 19, 29, 39) as long as the corresponding incoming line (5, 6, 7, 8) has not been switched to an outgoing line (10, 20, 30, 40, 50, 60, 70).

36. The router according to claim 35, wherein the first combinational block (202, 212, 222, 232), during the high state of the first clock cycle (CK1), sets a bit of an output availability signal (A12) to a high state in order to indicate that an available output has been defined for the corresponding input (9, 19, 29, 39) and in that the second combinational block (204, 214, 224, 234), during a clock cycle state that follows the high state of the first clock cycle (CK1), validates the request (R1, R2, R3, R4) to access the memory (89).

37. The router according to claim 35, wherein the second control device (OC2) comprises for each input (9, 19, 29, 39) a second combinational block (204, 214, 224, 234) for defining, during a high state of the first clock cycle (CK1), a request (R1, R2, R3, R4) to access the memory (89) corresponding to the output (49, 59, 69, 79) to which the data packet arriving in said input (9, 19, 29, 39) is to be routed, for which there is an available cell in the memory (89), as long as the corresponding incoming line (5, 6, 7, 8) has not been switched to an outgoing line (10, 20, 30, 40, 50, 60, 70).

38. The router according to claim 37, wherein the second control device (OC2) comprises, for each write input (101, 102, 103, 104) of the memory (89), an arbitration circuit (205, 215, 225, 235) for retaining, during the high state of a second clock cycle (CK2), no more than one of the inputs (9, 19, 29, 39), that requests to initiate a switching of the corresponding incoming line (5, 6, 7, 8) to the corresponding outgoing line (10, 20, 30, 40), in order to perform said switching.

39. The router according to claim 35, wherein the first control device (OC1) comprises for each output (49, 59, 69, 79) an arbitration circuit (240, 250, 260, 270) for retaining, during the low state of the first clock cycle (CK1), no more than one of the inputs (9, 19, 29, 39), that requests a switching of the corresponding incoming line (5, 6, 7, 8) to the corresponding outgoing line (50, 60, 70, 80), to be initiated in order to perform said switching in the absence of a switching request issuing from the memory (89).

40. The router according to claim 29, wherein the first control device (OC1) comprises for each output (49, 59, 69, 79) an arbitration circuit (240, 250, 260, 270) for retaining, during the low state of the first clock cycle (CK1), no more than one of the inputs (9, 19, 29, 39), that requests a switching of the corresponding incoming line (5, 6, 7, 8) to the corresponding outgoing line (50, 60, 70, 80), to be initiated in order to perform said switching in the absence of a switching request issuing from the memory (89).

* * * * *

UNITED STATES PATENT AND TRADEMARK OFFICE
CERTIFICATE OF CORRECTION

PATENT NO. : 6,775,286 B1  Page 1 of 1
DATED : August 10, 2004
INVENTOR(S) : Alain Goeury It is certified that error appears in the above-identified patent and that said Letters Patent is hereby corrected as shown below:

Column 20,
Line 31, after "30," replace "49" with -- 40 --.

Signed and Sealed this

Fifteenth Day of November, 2005

JON W. DUDAS
*Director of the United States Patent and Trademark Office*